United States Patent
Wu et al.

(10) Patent No.: US 12,255,338 B2
(45) Date of Patent: Mar. 18, 2025

(54) ATOMICALLY DISPERSED PLATINUM-GROUP METAL-FREE CATALYSTS AND METHOD FOR SYNTHESIS OF THE SAME

(71) Applicants: The Research Foundation for The State University of New York, Buffalo, NY (US); Giner, Inc., Newton, MA (US)

(72) Inventors: Gang Wu, Clarence Center, NY (US); Hui Xu, Acton, MA (US); Mengjie Chen, Buffalo, NY (US); Fan Yang, Acton, MA (US)

(73) Assignees: The Research Foundation for the State University of New York, Amherst, NY (US); Giner, Inc., Newton, MA (US)

( * ) Notice: Subject to any disclaimer, the term of this patent is extended or adjusted under 35 U.S.C. 154(b) by 119 days.

(21) Appl. No.: 17/464,458

(22) Filed: Sep. 1, 2021

(65) Prior Publication Data
US 2022/0069315 A1 Mar. 3, 2022

Related U.S. Application Data

(60) Provisional application No. 63/073,371, filed on Sep. 1, 2020.

(51) Int. Cl.
*H01M 4/90* (2006.01)
*H01M 8/1004* (2016.01)

(52) U.S. Cl.
CPC ........... *H01M 4/90* (2013.01); *H01M 8/1004* (2013.01)

(58) Field of Classification Search
CPC .... H01M 4/90; H01M 8/1004; H01M 4/8673; H01M 4/8885; H01M 4/9083; H01M 4/8652; H01M 2008/1095; Y02E 60/50
See application file for complete search history.

(56) References Cited

U.S. PATENT DOCUMENTS

| | | | |
|---|---|---|---|
| 3,282,875 | A | 11/1966 | Connolly et al. |
| 4,470,889 | A | 9/1984 | Ezzell et al. |

(Continued)

FOREIGN PATENT DOCUMENTS

| | | |
|---|---|---|
| AU | 2017203318 A1 | 6/2017 |
| CN | 109378482 A | 2/2019 |

(Continued)

OTHER PUBLICATIONS

Li et al., Atomically dispersed manganese catalyst for oxygen reduction in proton-exchange membrane fuel cells, 2018, Nature catalysis, https:lldoi.org/10.1038/s41929-018-0164-8 (Year: 2018).*

(Continued)

*Primary Examiner* — Helen Oi K Conley
(74) *Attorney, Agent, or Firm* — KRIEGSMAN & KRIEGSMAN

(57) ABSTRACT

Atomically dispersed platinum-group metal-free catalyst and method for synthesizing the same. According to one embodiment, the catalyst is made by a method in which, in a first step, an Mn-doped ZIF-8 catalyst precursor is prepared by reacting a first solution comprising zinc nitrate hexahydrate and manganese chloride dissolved in an acid/water solution with a second solution comprising 2-methylimidazole dissolved in water. Then, in a second step, the Mn-doped ZIF-8 catalyst precursor is thermally activated, i.e., carbonized, to form an Mn—N—C catalyst. Preferably, the thermal activation is performed in a multistep fashion, first at a lower temperature of about 800° C. and then at a higher temperature of about 1100° C. After carbonization, the catalyst material may optionally be subjected to an absorption process, followed by a second thermal activation. The absorption process may involve dispersing the catalyst material in a solution of manganese chloride and urea in hydrochloric acid and isopropanol.

31 Claims, 30 Drawing Sheets

(56) References Cited

U.S. PATENT DOCUMENTS

| | | | |
|---|---|---|---|
| 4,478,695 | A | 10/1984 | Ezzell et al. |
| 6,492,431 | B1 | 12/2002 | Cisar |
| 9,595,727 | B2 | 3/2017 | Mittelsteadt et al. |
| 9,825,308 | B1 | 11/2017 | Liu et al. |
| 10,998,550 | B2 | 5/2021 | Wang et al. |
| 2015/0340705 | A1 | 11/2015 | Tylus et al. |
| 2017/0232431 | A1 | 8/2017 | Jeong et al. |
| 2017/0279109 | A1 | 9/2017 | Wang |
| 2018/0316009 | A1 | 11/2018 | Park et al. |
| 2019/0020028 | A1 | 1/2019 | Wang et al. |
| 2019/0060888 | A1 | 2/2019 | Liu et al. |
| 2019/0067706 | A1 | 2/2019 | Liu et al. |
| 2019/0152995 | A1 | 5/2019 | Gunasekaran et al. |
| 2019/0386318 | A1 | 12/2019 | Li et al. |
| 2021/0316289 | A1 | 10/2021 | Ma et al. |
| 2022/0190356 | A1 | 6/2022 | Wu et al. |
| 2022/0416260 | A1 | 12/2022 | Wu et al. |
| 2023/0067623 | A1 | 3/2023 | Stahl et al. |
| 2023/0271840 | A1 | 8/2023 | Wu et al. |

FOREIGN PATENT DOCUMENTS

| | | | | |
|---|---|---|---|---|
| CN | 110302821 | * | 6/2020 | ............ B01J 27/24 |
| CN | 111403757 | A | 7/2020 | |
| CN | 112005413 | A | 11/2020 | |
| CN | 112310418 | A | 2/2021 | |
| EP | 3597800 | A1 | 1/2020 | |
| WO | 2012107838 | A1 | 8/2012 | |
| WO | 2014105407 | A1 | 7/2014 | |
| WO | 2018232054 | A1 | 12/2018 | |
| WO | 2021000217 | A1 | 1/2021 | |
| WO | 2021118707 | A1 | 6/2021 | |
| WO | 2022015888 | A2 | 1/2022 | |

OTHER PUBLICATIONS

Written Opinion mailed Feb. 28, 2022, from PCT Application No. PCT/US21/48748, the corresponding PCT application to the present application.

U.S. Appl. No. 17/531,461, inventors Gang Wu et al., filed Nov. 19, 2021.

Zhang et al., "Engineering nanostructures of PGM-free oxygen-reduction catalysts using metal-organic frameworks," Nano Energy, 31:331-350 (2017).

International Search Report mailed Feb. 28, 2022, from PCT Application No. PCT/US21/48748, the corresponding PCT application to the present application.

Yang et al., "Uniform Supported Metal Nanocrystal Catalysts Prepared by Slurry Freeze-Drying," Chem. Mat., 33(1):256-265 (Dec. 24, 2020).

Chen et al., "High-Platinum-Content Catalysts on Atomically Dispersed and Nitrogen Coordinated Single Manganese Site Carbons for Heavy-Duty Fuel Cells," Journal of The Electrochemical Society, 169(3):034510 (Mar. 2022).

Qiao et al., "Atomically dispersed single iron sites for promoting Pt and Pt3Co fuel cell catalysts: performance and durability improvements," Energy Environ. Sci., 14:4948-4960 (Jul. 26, 2021).

Chen et al., "Atomically Dispersed MnN4 Catalysts via Environmentally Benign Aqueous Synthesis for Oxygen Reduction: Mechanistic Understanding of Activity and Stability Improvements," ACS Catalysis, 10(18):10523-10534 (Sep. 3, 2020).

Abstract of Guo et al., "Promoting Atomically Dispersed MnN4 Sites via Sulfur Doping for Oxygen Reduction: Unveiling Intrinsic Activity and Degradation in Fuel Cells," ACS Nano, 15(4):6886-6899 (Mar. 31, 2021).

Abstract of Qiao et al., "3D porous graphitic nanocarbon for enhancing the performance and durability of Pt catalysts: a balance between graphitization and hierarchical porosity," Energy & Environmental Science, 12:2830-2841 (2019).

Abstract of Liu et al., "Chemical Vapor Deposition for Atomically Dispersed and Nitrogen Coordinated Single Metal Site Catalysts," Angewandte Chemie International Edition, 59(48):21698-21705 (Aug. 21, 2020).

* cited by examiner

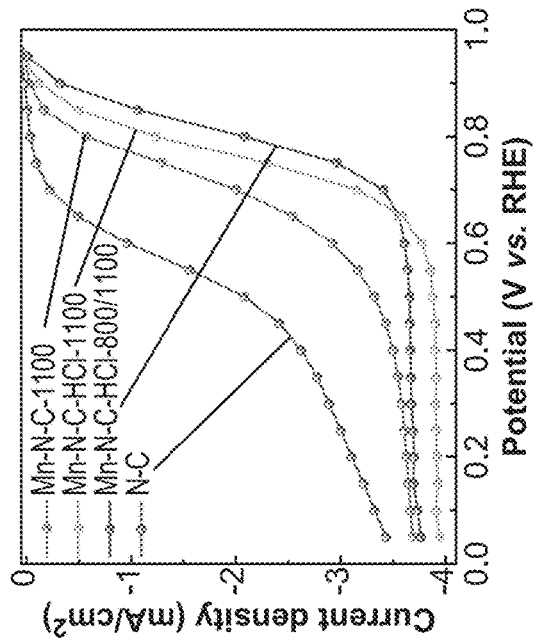
FIG. 9A
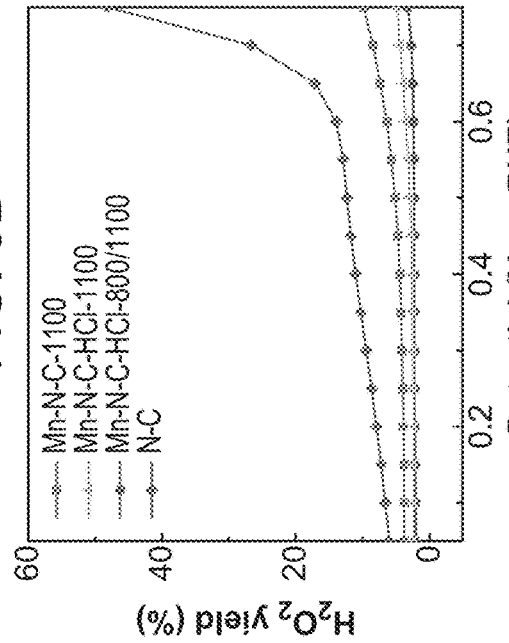
FIG. 9B
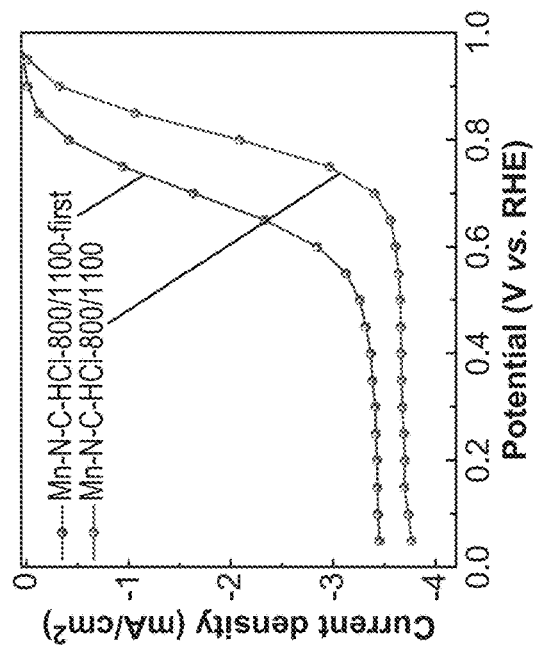
FIG. 9C
FIG. 9D

| Samples | $V_{micro}$ | | $V_{meso}$ | | $V_{macro}$ | | $V_{total}$ | $S_{BET}$ |
|---|---|---|---|---|---|---|---|---|
| | /cm³g⁻¹ | % | /cm³g⁻¹ | % | /cm³g⁻¹ | % | /cm³g⁻¹ | /m²g⁻¹ |
| Mn-N-C-1100 | 0.22 | 21.8 | 0.71 | 70.4 | 0.08 | 0.08 | 1.01 | 635 |
| Mn-N-C-HCl-1100 | 0.30 | 45.5 | 0.23 | 34.8 | 0.13 | 19.7 | 0.66 | 828 |
| Mn-N-C-HCl-800/1100 | 0.52 | 29.4 | 0.73 | 41.2 | 0.52 | 29.4 | 1.77 | 1511 |

FIG. 13

|  | C | N | O | Mn | Zn |
|---|---|---|---|---|---|
| Mass Conc. % | 91.8 | 3.6 | 2.2 | 2.0 | 0.4 |
| Atomic Conc. % | 94.5 | 3.2 | 1.7 | 0.5 | 0.1 |

FIG. 15

|  | Mn-N-C-1100 | Mn-N-C-HCl-800/1100 | Mn-N-C-HCl-1100 | NC |
|---|---|---|---|---|
| Tafel slope (mV/dec⁻¹) | 83 | 74 | 81 | 104 |

FIG. 16

| Samples | $V_{micro}$ /cm³g⁻¹ | % | $V_{meso}$ /cm³g⁻¹ | % | $V_{macro}$ /cm³g⁻¹ | % | $V_{total}$ /cm³g⁻¹ | $S_{BET}$ /m²g⁻¹ |
|---|---|---|---|---|---|---|---|---|
| 30 nm | 0.41 | 20.2 | 1.38 | 68.3 | 0.23 | 11.5 | 2.02 | 1224 |
| 85 nm | 0.52 | 29.4 | 0.73 | 41.2 | 0.52 | 29.4 | 1.77 | 1511 |
| 200 nm | 0.37 | 47.0 | 0.21 | 26.5 | 0.21 | 26.5 | 0.79 | 923 |

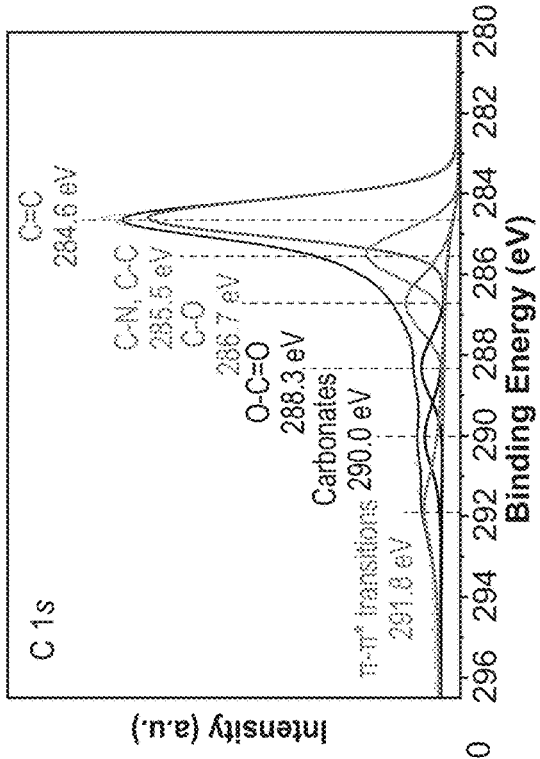
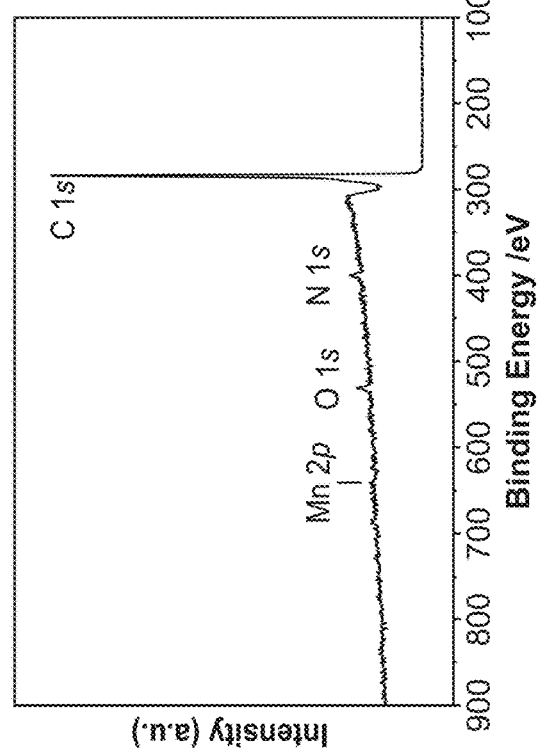
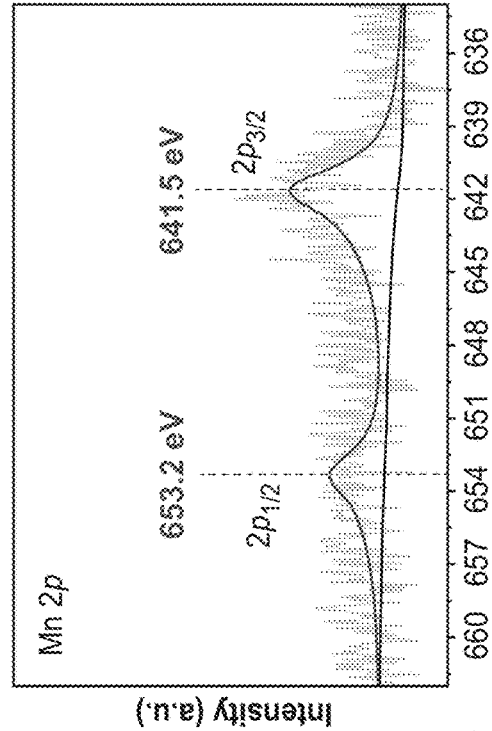
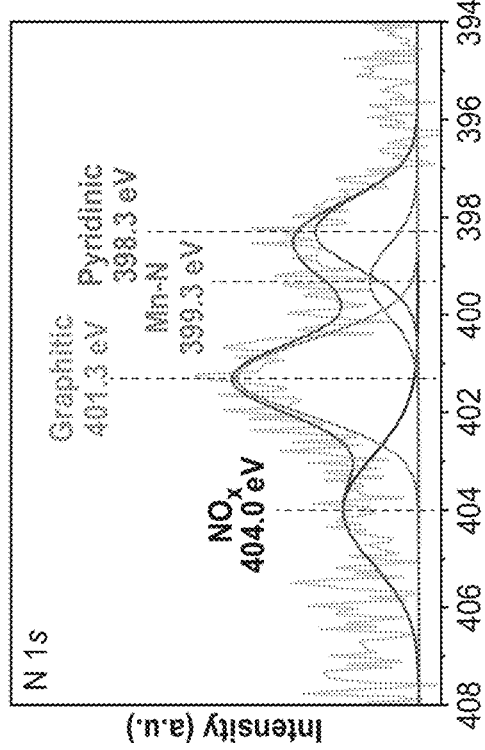
FIG. 25A
FIG. 25B
FIG. 25C
FIG. 25D

| Sample | Path | CN | R(Å) | σ² (Å²) | ΔE₀ (eV) |
|---|---|---|---|---|---|
| MnPc | Mn-N (1st) | 4 | 1.964(4) | 0.004(1) | 2.9(7) |
| | Mn-C (2nd) | 8 | 2.99(1) | 0.005(1) | |
| | Mn-N (3rd) | 4 | 3.33(1) | 0.008(7) | |
| | Mn-C (4th) | 8 | 3.80(2) | 0.010(3) | |
| Mn-N-C-HCl- 800/1100 | Mn-N (1st) | 3.8 (1.5) | 2.00 (6) | 0.007(7) | 0.6±3.2 |
| | Mn-C (2nd) | 1.5(1.7) | 4.5±2.4 | -0.005±0.010 | |

FIG. 28

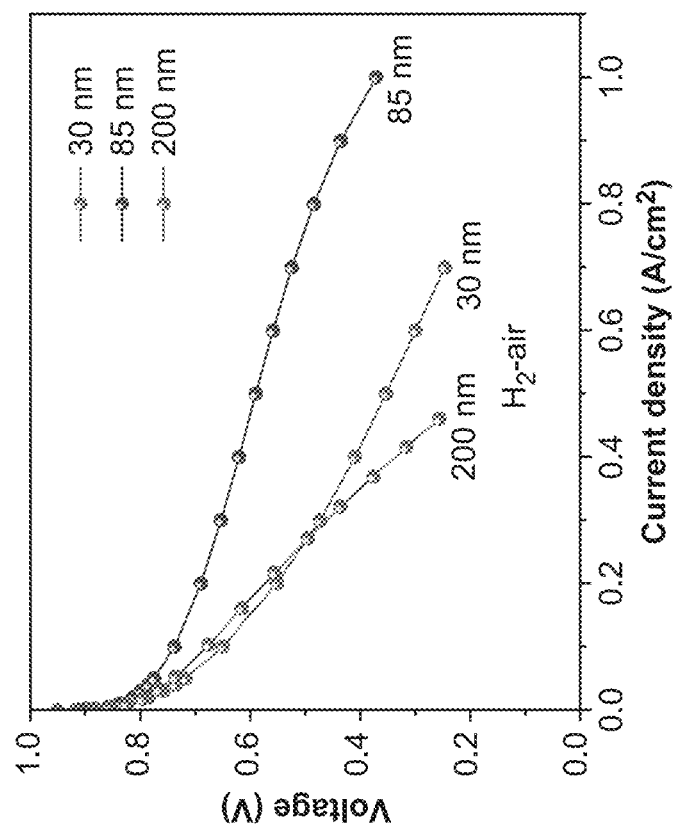
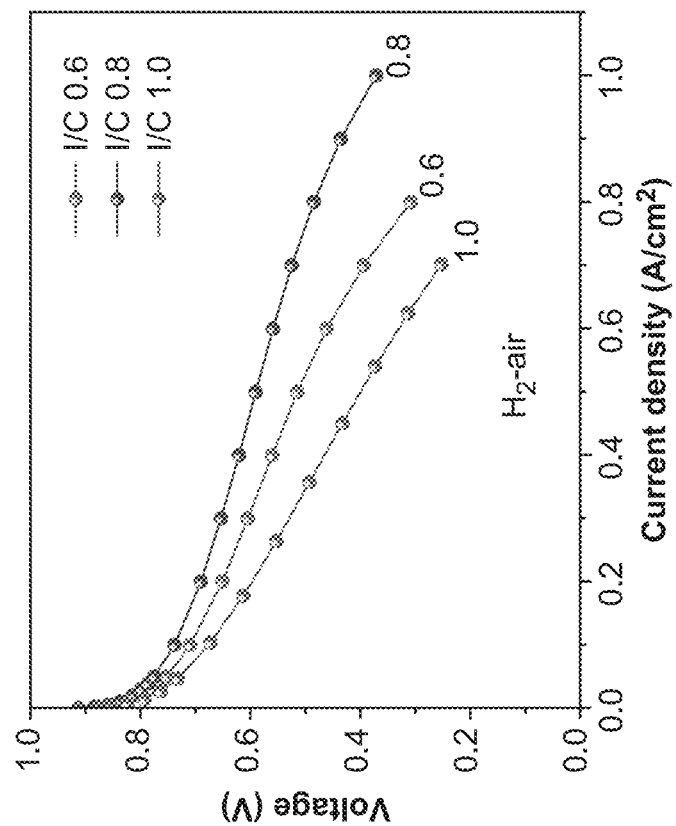
FIG. 29D
FIG. 29C

ATOMICALLY DISPERSED PLATINUM-GROUP METAL-FREE CATALYSTS AND METHOD FOR SYNTHESIS OF THE SAME

CROSS-REFERENCE TO RELATED APPLICATIONS

The present application claims the benefit under 35 U.S.C. 119(e) of U.S. Provisional Patent Application No. 63/073,371, inventors Gang Wu et al., filed Sep. 1, 2020, the disclosure of which is incorporated herein by reference in its entirety.

FEDERALLY SPONSORED RESEARCH OR DEVELOPMENT

This invention was made with government support under grant numbers DE-EE0008075 and DE-EE0008076awarded by the Department of Energy. The government has certain rights in the invention.

BACKGROUND OF THE INVENTION

The present invention relates generally to catalysts suitable for catalyzing the oxygen reduction reaction in proton-exchange membrane fuel cells and relates more particularly to catalysts of the aforementioned type that are platinum-group metal (PGM)-free and also to a method for the synthesis of such catalysts.

Fuel cells, particularly proton exchange membrane (PEM) fuel cells, represent a promising sustainable and clean energy conversion technology for a number of different applications including, but not limited to, the field of transportation. In a PEM fuel cell, the chemical energy of a fuel, typically hydrogen, and of an oxidizing agent, typically oxygen, is converted into electricity through a pair of redox reactions. Where oxygen is used as the oxidizing agent, the redox reaction involving oxygen is often referred to as the oxygen reduction reaction and typically results in the reduction of oxygen to water. As can be appreciated, the oxygen reduction reaction represents a critical process in the operation of a PEM fuel cell and requires an effective and durable catalyst to attain efficient energy conversion. Typically, platinum-group metals (i.e., platinum and five other noble, precious metal elements clustered with platinum in the periodic table) have been used as such a catalyst, and such metals have shown promising performance and durability in real applications. Unfortunately, however, the high cost and scarcity of platinum-group metals have limited their large-scale deployment in PEM fuel cells and have driven efforts to find to platinum-group metal (PGM)-free catalysts for PEM fuel cells.

One approach to developing a platinum-group metal (PGM)-free catalyst involves using earth-abundant elements and, more specifically, involves forming atomically dispersed metal single sites coordinated with nitrogen (typically as $N_4$) and embedded within a carbon matrix to create metal-nitrogen-carbon (M—N—C) catalysts. In these catalysts, the atomic $MN_4$ moieties, which are generally dispersed and embedded in micropores of the carbon matrix, are identified as oxygen reduction reaction active sites, as evidenced by advanced spectroscopic characterizations and first-principles calculations. Typically, the metal in such M—N—C catalysts is a first row transition metal, such as iron, nickel, manganese, cobalt, or copper. Many such M—N—C catalysts have shown great promise due to their high intrinsic activity and reasonable stability for the oxygen reduction reaction in acidic media.

In general, the production of M—N—C catalysts includes two stages, namely, the synthesis of a catalyst precursor and, then, the high temperature treatment or carbonization of the catalyst precursor to form active sites to be occupied by $MN_4$ moieties. See, for example, Zhang et al., "Engineering nanostructures of PGM-free oxygen-reduction catalysts using metal-organic frameworks," Nano Energy, 31:331-350 (2017), which is incorporated herein by reference. Current M—N—C catalysts are derived from zinc-based zeolitic imidazolate frameworks (ZIFs), a subfamily of metal-organic frameworks (MOFs). An example of a ZIF is 2-methylimidazole zinc salt (ZIF-8), which is typically in crystal form. ZIF-8-derived carbon materials synthesized via carbonization at high temperature (e.g., 1100° C.) possess an abundance of micropores and defects. The abundance of micropores and defects is favorable for hosting a high density of $MN_4$ sites with atomic dispersion in carbon.

Unfortunately, however, most of the aforementioned ZIF-8 crystals used to prepare M-N—C catalysts of the type described above are prepared using organic solvents, such as methanol and dimethylformamide. These organic solvents are toxic, costly, and potentially harmful to the environment, thus contradicting the sustainable concept of developing PGM-free catalysts for clean energy. Consequently, there is a need for an alternative approach to preparing M—N—C catalysts that does not suffer from the shortcomings noted above.

SUMMARY OF THE INVENTION

It is an object of the present invention to provide a new technique for making platinum-group metal (PGM)-free catalysts.

It is another object of the present invention to provide a technique as described above that overcomes at least some of the shortcomings associated with existing techniques for making such catalysts.

Therefore, according to one aspect of the invention, there is provided a method of preparing a catalyst, the method comprising the steps of (a) preparing an M-doped ZIF-8 catalyst precursor in an aqueous synthesis reaction, wherein M is selected from the group consisting of Mn, Fe, Ni, Cu, and Co, and wherein ZIF-8 is a 2-methylimidazole zinc salt; and (b) then, carbonizing the M-doped ZIF-8 catalyst precursor in a first thermal activating step to form an M—N—C catalyst, wherein M is said metal, N is nitrogen, and C is carbon.

In a more detailed feature of the invention, the aqueous synthesis reaction of step (a) may take place in the presence of an acid.

In a more detailed feature of the invention, the aqueous synthesis reaction of step (a) may take place in the absence of an organic solvent.

In a more detailed feature of the invention, the M-doped ZIF-8 precursor may be prepared by reacting a first solution comprising zinc nitrate hexahydrate and manganese chloride dissolved in a hydrochloric acid/water solution with a second solution comprising 2-methylimidazole dissolved in water.

In a more detailed feature of the invention, the molar ratio of $Mn^{2+}$ to $Zn^{2+}$ used for the aqueous synthesis reaction may range from greater than 0 up to about 10%.

In a more detailed feature of the invention, the molar ratio among $MnCl_2$, $Zn(NO_3)_2 \cdot 6H_2O$, and 2-methylimidazole may be about 0.015:1:47, respectively.

In a more detailed feature of the invention, M may be Mn.

In a more detailed feature of the invention, the first thermal activating step may comprise heating the Mn-doped ZIF-8 precursor at an elevated temperature of at least 600° C.

In a more detailed feature of the invention, the first thermal activating step may comprise heating the Mn-doped ZIF-8 precursor in a first step at a first temperature of about 600° C.-1000° C. and then in a second step at a second temperature of about 900° C.-1100° C., and the second temperature may be higher than the first temperature.

In a more detailed feature of the invention, the first thermal activating step may comprise heating the Mn-doped ZIF-8 precursor in a first step at a first temperature of about 800° C. and then in a second step at a second temperature of about 1100° C.

In a more detailed feature of the invention, the first thermal activating step may comprise heating the Mn-doped ZIF-8 precursor at a temperature of about 1100° C.

In a more detailed feature of the invention, the M—N—C catalyst may be an Mn—N—C catalyst, and the method may further comprise, after step (b), the steps of (c) adsorbing additional Mn ions into the Mn—N—C catalyst; and (d) then, performing a second thermal activating step on the catalyst of step (c).

In a more detailed feature of the invention, the aqueous synthesis reaction of step (a) may take place in the presence of an acid, the first thermal activating step may comprise a first temperature of about 800° C. and a second temperature of about 1100° C., and the second thermal activating step may comprise heating at about 1100° C.

In a more detailed feature of the invention, the M—N—C catalyst may have a particle size of about 30 nm to about 200 nm.

In a more detailed feature of the invention, the M—N—C catalyst may have a particle size of about 85 nm.

The present invention is also directed at a catalyst made by the above-described method.

The present invention is further directed at a membrane electrode assembly (MEA) suitable for use in a proton-exchange membrane fuel cell, the membrane electrode assembly comprising (a) a proton-exchange membrane, the proton-exchange membrane having opposing first and second faces; (b) an anode coupled to the first face of the proton-exchange membrane, the anode comprising an anode catalyst; and a cathode coupled to the second face of the proton-exchange membrane, the cathode comprising a cathode catalyst, the cathode catalyst comprising the catalyst described above.

The present invention is further directed at a PEM fuel cell that includes the aforementioned MEA.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. These drawings are not necessarily drawn to scale, and certain components may have undersized and/or oversized dimensions for purposes of explication or may omit certain features for purposes of clarity. In the drawings wherein like reference numerals represent like parts:

FIG. 9A is a graph depicting the steady-state oxygen reduction reaction polarization curves of Mn—N—C—HCl-800/1100-first and Mn—N—C—HCl-800/1100 catalysts prepared according to the present invention;

FIG. 9B is a graph depicting the steady-state oxygen reduction reaction polarization curves of Mn—N—C-1100, Mn—N—C—HCl-1100, Mn—N—C—HCl-800/1100 catalysts prepared according to the present invention, as well as that of an N—C catalyst;

FIG. 9C are Tafel plots of the oxygen reduction reaction for the Mn—N—C-1100, Mn—N—C—HCl-1100, Mn—N—C—HCl-800/1100, and N—C catalysts replotted from the above polarization curves;

FIG. 9D is a graph depicting the hydrogen peroxide yields of Mn—N—C-1100, Mn—N—C—HCl-1100, and Mn—N—C—HCl-800/1100 catalysts prepared according to the present invention, as well as that of an N—C catalyst;

FIG. 13 is a table providing pore size and BET surface areas for Mn—N—C-1100, Mn—N—C—HCl-1100, and Mn—N—C—HCl-800/1100 catalysts prepared according to the present invention;

FIG. 15 is a table providing elemental quantification determined by X-ray photoelectron spectroscopy (XPS) for an Mn—N—C—HCl-800/1100 catalyst prepared according to the present invention;

FIG. 16 is a table providing Tafel slopes of the oxygen reduction reaction for Mn—N—C-1100, Mn—N—C—HCl-1100, and Mn—N—C—HCl-800/1100 catalysts prepared according to the present invention, as well as that of N—C catalysts;

FIG. 25A is an X-ray photoelectron spectroscopy (XPS) spectra of an Mn—N—C—HCl-800/1100 catalyst prepared according to the present invention;

FIGS. 25B through 25D are graphs depicting high resolution of C 1s, N 1s and Mn 2p spectra, respectively, of the Mn—N—C—HCl-800/1100 catalyst of FIG. 25A;

FIG. 28 is a table displaying EXAFS data fitting results for MnPc and an Mn—N—C—HCl-800/1100 catalyst prepared according to the present invention;

FIG. 29C is a graph depicting polarization curves of an Mn—N—C—HCl-800/1100 catalyst prepared according to the present invention at various I/C ratios at 100% relative humidity under $H_2$-air conditions;

FIG. 29D is a graph depicting polarization curves of Mn—N—C catalysts prepared according to the present invention with different particle sizes;

DETAILED DESCRIPTION OF THE INVENTION

Figure 1:
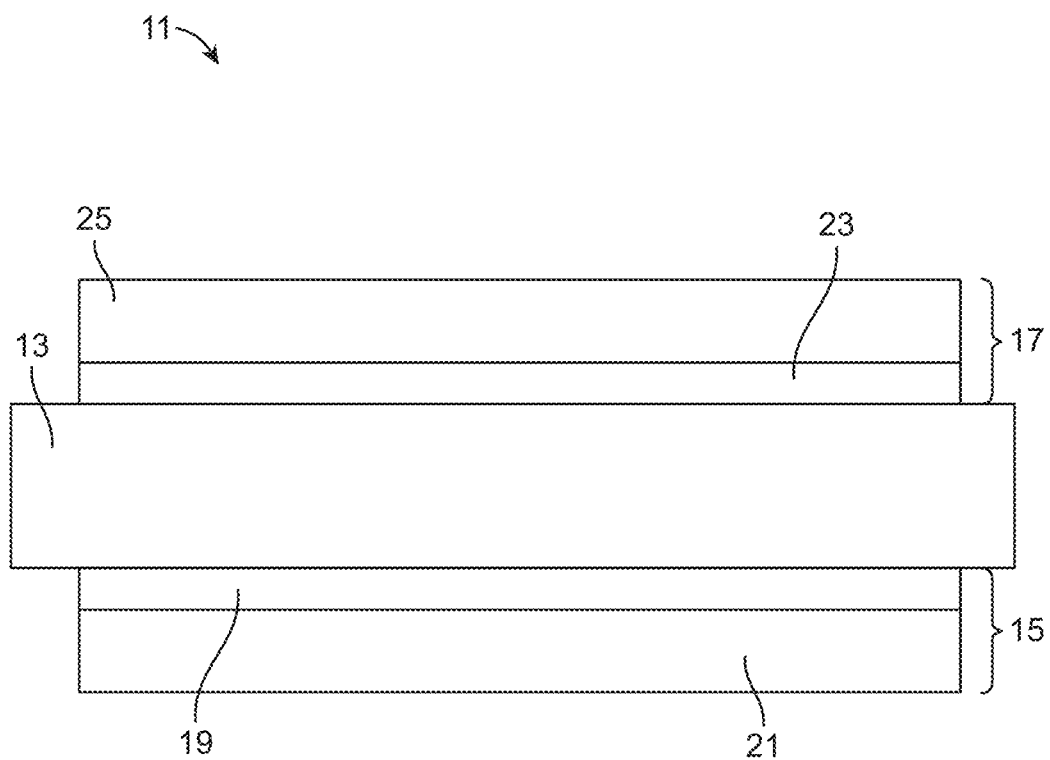
FIG. 1 is a simplified front view of one embodiment of a membrane electrode assembly constructed according to the present invention.

According to one aspect of the invention, there is disclosed a novel method for preparing an M—N—C catalyst, wherein M is selected from the group consisting of iron (Fe), cobalt (Co), nickel (Ni), copper (Cu), and manganese (Mn), with Mn being preferred. In one embodiment, the method may involve an aqueous solution synthesis method, and, in a preferred embodiment, the method may use an acid-assisted step-pyrolysis approach. The Mn—N—C catalyst prepared by the foregoing method may be used as a cathode catalyst in a fuel cell and typically exhibits significantly enhanced activity and fuel cell performance, dramatically outperforming other Mn—N—C catalysts made using a dimethylformamide (organic solvent) synthesis method. For example, the Mn—N—C catalyst prepared by the foregoing method typically demonstrates remarkable membrane electrode assembly (MEA) performance, i.e., a peak power density of 0.39 W cm$^{-2}$ under H$_2$-air. In addition, the Mn—N—C catalyst prepared by the foregoing method typically possesses homogeneous atomically dispersed MnN$_4$ active sites, which are directly confirmed by X-ray absorption spectroscopy (XAS) and high-resolution scanning transmission electron microscopy (STEM) images along with electron energy loss spectroscopy (EELS). Moreover, the aforementioned aqueous synthesis method typically yields a predominantly microporous carbon structure with a unique curved surface morphology, which is believed to be beneficial for hosting MnN$_4$ moieties and for improved mass transport. Enhanced stability may also be achieved due to the robust nature of MnN$_4$ and the formation of a graphitic carbon structure with a high degree of curvature.

Compared to FeN$_4$ catalysts, the Mn—N—C catalyst prepared by the present method typically exhibits higher resistance for metal leaching of MnN$_4$ moieties, as confirmed by density functional theory (DFT) calculation. In short, the foregoing method provides a new approach to developing atomically dispersed single metal atom site catalysts by using an environmentally friendly aqueous synthesis technique with improved catalyst performance relative to traditional organic solvent-based synthesis.

The catalyst of the present invention may be suitable for one or more of a number of applications including, but not limited to, oxygen reduction, CO$_2$ reduction, nitrate reduction, and nitrogen reduction.

More specifically, according to one embodiment of the invention, a novel Mn—N—C cathode catalyst may be prepared by a method that first comprises preparing an Mn-doped ZIF-8 precursor. The Mn-doped ZIF-8 precursor preferably is prepared using one or more aqueous solvents, such as an acid solution, which may be, for example, a hydrochloric acid/water solution or a nitric acid/water solution, and preferably is devoid of any organic solvents. For example, the Mn-doped ZIF-8 precursor may be prepared, for example, by reacting (a) a first solution comprising zinc nitrate hexahydrate (Zn(NO$_3$)$_2$.6H$_2$O) and manganese chloride (MnCl$_2$) dissolved in a hydrochloric acid/water solution with (b) a second solution comprising 2-methylimidazole dissolved in water. The molar ratio of Mn$^{2+}$ to Zn$^{2+}$ used for the synthesis can range from greater than 0 up to about 10%. Preferably, the molar ratio among MnCl$_2$, Zn(NO$_3$)$_2$.6H$_2$O, and 2-methylimidazole is about 0.015:1:47, respectively. The particle size of the Mn/ZIF precursor may be adjusted by modifying the concentration of chemicals in the synthesis reaction. For example, the concentration of Zn$^{2+}$ in the aqueous solution may be adjusted at 66.9 mmol l$^{-1}$, 96.1 mmol l$^{-1}$, and 122.8 mmol l$^{-1}$ to prepare Mn catalysts with 30 nm, 85 nm, 200 nm, respectively. In other words, as the molar ratio of water to Zn$^{2+}$ decreases, the catalyst particle size increases.

After collecting the precipitate by centrifugation, followed by washing with alcohol, the precipitate may be dried, for example, by heating at 60° C. in an oven overnight.

Next, the Mn-doped ZIF-8 precursor may be thermally activated (i.e., carbonized). The thermal activation may take place in a single pyrolysis step, such as by heating at an elevated temperature, such as 1100° C., or may take place in a multi-step pyrolysis process, such as by heating at a first temperature (e.g., 600° C.-1000° C., preferably 800° C.) for a first interval and then heating at a second temperature, which may be a higher temperature (e.g., 900° C.-1100° C.) for a second interval. Preferably, the foregoing heating takes place in an argon (Ar) atmosphere.

After the aforementioned carbonization has taken place, the catalyst material may optionally be subjected to further processing. In one embodiment, such further processing may comprise an absorption process, followed by a second thermal activation step. The absorption process may comprise, for example, dispersing the catalyst material in a solution, wherein the solution may comprise manganese chloride and urea in a solvent comprising hydrochloric acid and isopropanol, preferably in equal amounts. Next, the solution may be ultrasonicated for a period of time, such as 30 minutes, and then may be subjected to magnetic stirring for a period of time, such as two hours. Next, the mixture may be subjected to centrifugation and then dried, for example, at 60° C. in a vacuum oven for 12 hours. The second thermal activation step may be conducted, for example, at a temperature of 1100° C. in an Ar atmosphere for one hour.

Fe, Co, Ni, and Cu may be used in place of Mn; however, the use of Fe may suffer from the shortcoming that H$_2$O$_2$ generated during the oxygen reduction reaction may react with Fe$^{3+}$/Fe$^{2+}$ to form hydroxyl and hydroperoxyl radicals, which may be detrimental as such radicals tend to attack organic ionomers, membranes, and catalysts. Nevertheless, for the synthesis of an Fe—N—C catalyst, a procedure similar to that described above to make an Mn—N—C catalyst may be used although highly active Fe—N—C catalysts may be obtained without performing the above-described adsorption and second thermal conversion steps. The molar ratio of Fe$^{3+}$ to Zn$^{2+}$ used for the synthesis can range from greater than 0 up to about 30%.

Referring now to FIG. 1, there is shown a simplified front view of one embodiment of a membrane electrode assembly constructed according to the present invention, the membrane electrode assembly being represented generally by reference numeral 11. (For simplicity and clarity, certain components of membrane electrode assembly 11 that are not critical to the understanding of the present invention are either not shown or described herein or are shown and/or described herein in a simplified manner.)

Membrane electrode assembly (MEA) 11, which may be suitable for use in, for example, a fuel cell or other electrochemical cell, may comprise a proton exchange membrane (also sometimes referred to as a solid polymer electrolyte membrane) (PEM) 13. PEM 13 is preferably a non-porous, ionically-conductive, electrically-non-conductive, liquid permeable and substantially gas-impermeable membrane. PEM 13 may consist of or comprise a homogeneous perfluorosulfonic acid (PFSA) polymer. Said PFSA polymer may be formed by the copolymerization of tetrafluoroethylene and perfluorovinylether sulfonic acid. See e.g., U.S. Pat. No. 3,282,875, inventors Connolly et al., issued Nov. 1, 1966; U.S. Pat. No. 4,470,889, inventors Ezzell et. al., issued Sep. 11, 1984; U.S. Pat. No. 4,478,695, inventors Ezzell et. al., issued Oct. 23, 1984; U.S. Pat. No. 6,492,431, inventor Cisar, issued Dec. 10, 2002; and U.S. Pat. No. 9,595,727 B2, inventors Mittelsteadt et al., issued Mar. 14, 2017, all of which are incorporated herein by reference in their entireties. A commercial embodiment of a PFSA polymer electrolyte membrane is manufactured by The Chemours Company FC, LLC (Fayetteville, N.C.) as NAFION™ extrusion cast PFSA polymer membrane.

MEA 11 may further comprise an anode 15 and a cathode 17. Anode 15 and cathode 17 may be positioned along two opposing major faces of PEM 13. In the present embodiment, anode 15 is shown positioned along the bottom face of PEM 13, and cathode 17 is shown positioned along the top face of PEM 13; however, it is to be understood that the positions of anode 15 and cathode 17 relative to PEM 13 could be reversed.

Anode 15, in turn, may comprise an anode electrocatalyst layer 19 and an anode support 21. Anode electrocatalyst layer 19 may be positioned in direct contact with PEM 13, and, in the present embodiment, is shown as being positioned directly below and in contact with the bottom side of PEM 13. Anode electrocatalyst layer 19 defines the electrochemically active area of anode 15 and preferably is sufficiently porous and electrically- and ionically-conductive to sustain a high rate of surface oxidation reaction. Anode electrocatalyst layer 19, which may be an anode electrocatalyst layer of the type conventionally used in a PEM-based fuel cell, may comprise electrocatalyst particles in the form of a finely divided electrically-conductive and, optionally, ionically-conductive material (e.g., a metal powder) which can sustain a high rate of electrochemical reaction. The electrocatalyst particles may be distributed within anode electrocatalyst layer 19 along with a binder, which is preferably ionically-conductive, to provide mechanical fixation.

Anode support 21, which may be an anode support of the type conventionally used in a PEM-based fuel cell, preferably is sufficiently porous to allow fluid (gas and/or liquid) transfer between anode electrocatalyst layer 19 and some fluid conveying tube, cavity, or structure. Anode support 21 is preferably electrically-conductive to provide electrical connectivity between anode electrocatalyst layer 19 and an anode current collector or similar structure. Anode support 21 is also preferably ionically-non-conductive. Anode support 21 may be positioned in direct contact with anode electrocatalyst layer 19 and, in the present embodiment, is shown as being positioned directly below anode electrocatalyst layer 19 such that anode electrocatalyst layer 19 may be sandwiched between and in contact with PEM 13 and anode support 21. Anode support 21 may be dimensioned to entirely cover a surface (e.g., the bottom surface) of anode electrocatalyst layer 19, and, in fact, anode 15 may be fabricated by depositing anode electrocatalyst layer 19 on anode support 21.

Cathode 17 may comprise a cathode electrocatalyst layer 23 and a cathode support 25. Cathode electrocatalyst layer 23 may be positioned in direct contact with PEM 13, and, in the present embodiment, is shown as being positioned directly above and in contact with the top of PEM 13. Cathode electrocatalyst layer 23 defines the electrochemically active area of cathode 17 and preferably is sufficiently porous and electrically- and ionically-conductive to sustain a high rate of surface reduction reaction. Cathode electrocatalyst layer 23 may comprise an M-N—C catalyst of the present invention and may be in the form of particles of said catalyst along with a suitable binder, which is preferably ionically-conductive, to provide mechanical fixation.

Cathode support 25, which may be a cathode support of the type conventionally used in a PEM-based fuel cell and may be, for example, a film or sheet of porous carbon, preferably is sufficiently porous to allow fluid (gas and/or liquid) transfer between cathode electrocatalyst layer 23 and some fluid conveying tube, cavity, or structure. In addition, cathode support 25 is electrically-conductive to provide electrical connectivity between cathode electrocatalyst layer 23 and a cathode current collector. Cathode support 25 is also preferably ionically-non-conductive. Cathode support 25 may be positioned in direct contact with cathode electrocatalyst layer 23 and, in the present embodiment, is shown as being positioned directly above cathode electrocatalyst layer 23 such that cathode electrocatalyst layer 23 may be sandwiched between and in contact with PEM 13 and cathode support 25. Cathode support 25 may be dimensioned to entirely cover a surface (e.g., the top surface) of cathode electrocatalyst layer 23, and, in fact, cathode 17 may be fabricated by depositing cathode electrocatalyst layer 23 on cathode support 25.

The following examples are given for illustrative purposes only and are not meant to be a limitation on the invention described herein or on the claims appended hereto.

Example 1: Catalyst Synthesis, Structures, and Morphologies

Three different subclasses of Mn—N—C catalysts, denoted herein as Mn—N—C—HCl-800/1100, Mn—N—C—HCl-1100, and Mn—N—C-1100, were synthesized and studied. Information for synthesizing examples of each of these three different classes of catalysts is set forth below.

For example, to make an Mn—N—C—HCl-800/1100 catalyst, 2.631 g zinc nitrate hexahydrate ($Zn(NO_3)_2 \cdot 6H_2O$) and 16 mg manganese chloride ($MnCl_2$) were dissolved in 12 ml, 0.25M hydrochloric acid aqueous solution, followed by sonicating for 5 min. This solution was labeled Solution A. 33.9 g 2-methylimidazole were dissolved in 80 ml Millipore water in an Erlenmeyer flask, followed by sonicating to produce a transparent Solution B. In the present case, the molar ratio among $MnCl_2$, $Zn(NO_3)_2 \cdot 6H_2O$, and 2-methylimidazole was 0.015:1:47, respectively. However, it may be noted that, by modifying the relative concentrations of these chemicals, it is possible to vary the particle size of the resultant Mn/ZIF catalyst precursor. For example, the concentration of $Zn^{2+}$ in the aqueous solution may be adjusted to 66.9 mmol $1^{-1}$, 96.1 mmol $1^{-1}$, or 122.8 mmol $1^{-1}$ to prepare Mn catalysts with 30 nm, 85 nm, or 200 nm particle sizes, respectively. Solution A was added to Solution B in the Erlenmeyer flask under stirring and was kept at stirring for six hours at room temperature. The Erlenmeyer flask was sealed with parafilm. Then, the precipitate was collected by centrifugation, followed by thorough washing with alcohol five times. The precipitate was then dried at 60° C. in an oven overnight. Then, 200 mg of the precipitate (i.e., the Mn-doped ZIF-8 catalyst precursor) was carbonized in a multistep-pyrolysis first thermal activation, which involved subjecting the catalyst precursor to a temperature of 800° C. for 2 hours and then to a temperature of 1100° C. for 1 hour in a tube furnace under the protection of an argon (Ar) flow. The resultant catalyst is herein denoted as Mn—N—C—HCl-800/1100-first, with the suffix "first" denoting that the catalyst was subjected only to a first thermal activation. Then, the aforementioned Mn—N—C—HCl-800/1100-first catalyst was subjected to an adsorption step, which included dispersing 20 mg of the catalyst in 2 ml of a solution containing 20 mg manganese chloride and 100 mg urea in 2 ml of a 1:1 mixture of hydrochloric acid and isopropanol. After 30 min of ultra-sonication, along with two hours of magnetic stirring, the mixture was collected by centrifugation and then dried at 60° C. in a vacuum oven for 12 h. Subsequently, the catalyst was subjected to a second thermal activation at a temperature of 1100° C. under Ar atmosphere for one hour to synthesize the final catalyst, which is denoted herein as Mn—N—C—HCl-800/1100.

The synthesis of an Mn—N—C—HCl-1100 catalyst was generally similar to that described above for the Mn—N—C—HCl-800/1100 catalyst, the primary difference being that, in the case of the Mn—N—C—HCl-1100 catalyst, the Mn-doped ZIF-8 catalyst precursor was initially carbonized at 1100° C. (without the preceding 800° C. step) for the first thermal activation. The first thermal activation was then followed by an adsorption procedure and a second thermal activation, both of which were similar to that described above for Mn—N—C—HCl-800/1100.

The synthesis of an Mn—N—C-1100 catalyst was generally similar to that described above for the Mn—N—C—HCl-1100 catalyst, the primary difference being that, in the case of the Mn—N—C-1100 catalyst, the Mn-doped ZIF-8 catalyst precursor was synthesized in the absence of acid. In other words, zinc nitrate hexahydrate and manganese chloride were dissolved in water, as opposed to being dissolved in a hydrochloric acid aqueous solution.

As noted above, Mn—N—C catalysts synthesized with only a first thermal activation are denoted herein with a "-first" suffix, such as Mn—N—C—HCl-800/1100-first, Mn—N—C—HCl-1100-first, and Mn—N—C-1100-first, respectively. The suffix "first" is omitted where the catalysts are subjected to a second or subsequent thermal activation.

Nanocarbon (N—C) catalysts were also synthesized under similar conditions to those described above, except that the Mn salts were omitted.

Figure 2:
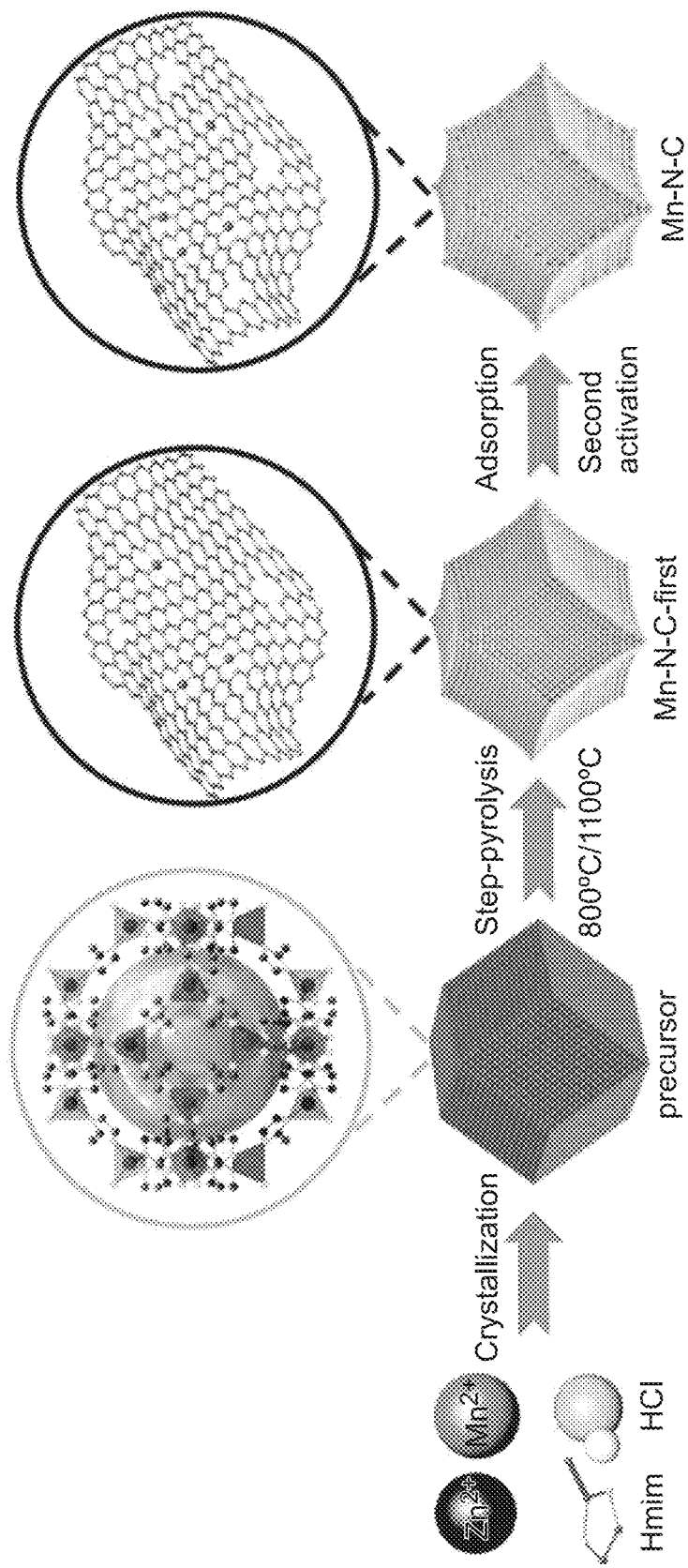
FIG. 2 is a schematic representation of one embodiment of a method for synthesizing a platinum-group metal (PGM)-free catalyst, for example, an Mn—N—C catalyst, in accordance with the present invention.
Figure 3:
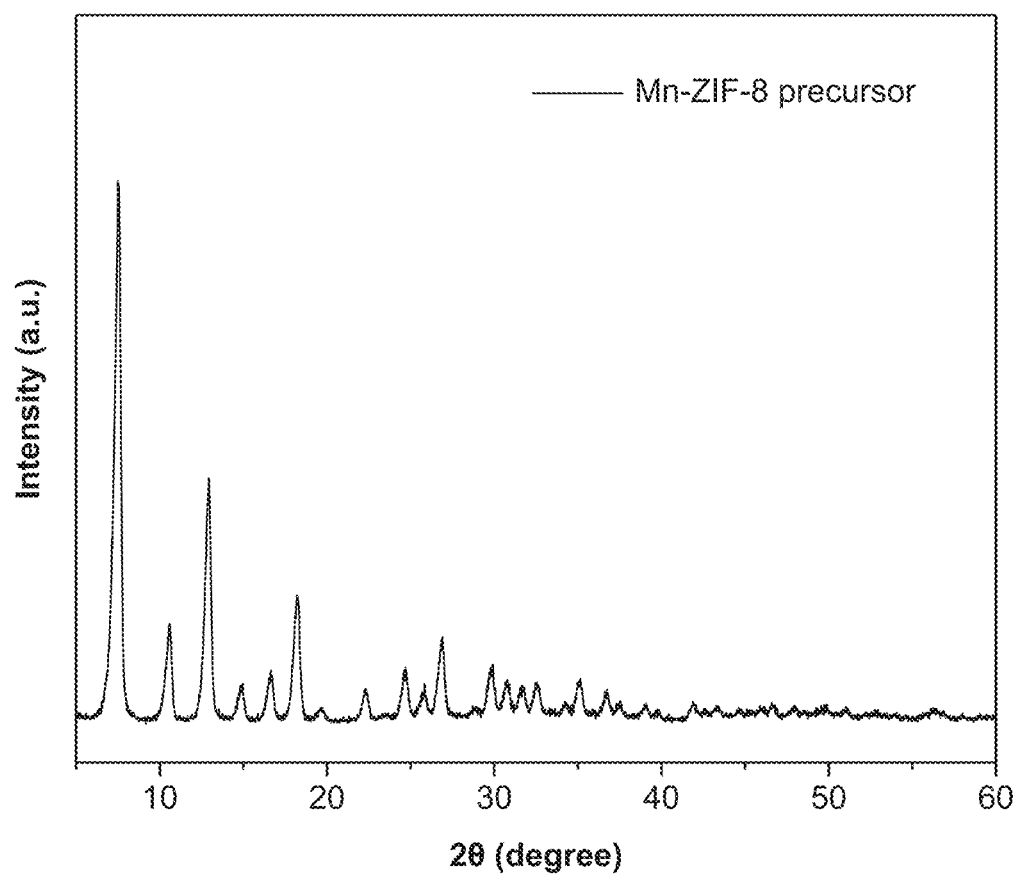
FIG. 3 is an X-ray diffraction pattern for an Mn/ZIF catalyst precursor, as discussed in Example 1.

A preferred embodiment of the catalyst synthesis procedure of the present invention is schematically depicted in FIG. 2. As can be seen therein, the initial Mn-doped ZIF-8 catalyst precursor may be synthesized in an aqueous synthesis reaction and, more particularly, in a system that includes a dilute hydrochloric acid. One of the great challenges for Mn—N—C synthesis is that Mn atoms tend to form inactive metallic compounds and oxides, instead of active single metal atom sites. The addition of hydrochloric acid to the reaction mixture mitigates the occurrence of hydrolysis, and, in so doing, prevents the formation of manganese oxides/clusters, thereby generating more porous structures. Moreover, the aqueous synthesis method of the present invention can significantly shorten the reaction time to form ZIF-8 crystals because their nucleation and crystallization rates in water are much faster than those in organic solvents. As can be seen in FIG. 3, based on its X-ray diffraction (XRD) pattern, the Mn-doped ZIF-8 catalyst precursor of the present invention seems to possess a crystal structure that is similar to that of reported ZIF-8s, further verifying the effectiveness of the aqueous solution of the present invention to form well-defined ZIF-8 crystals.

Figure 4A:
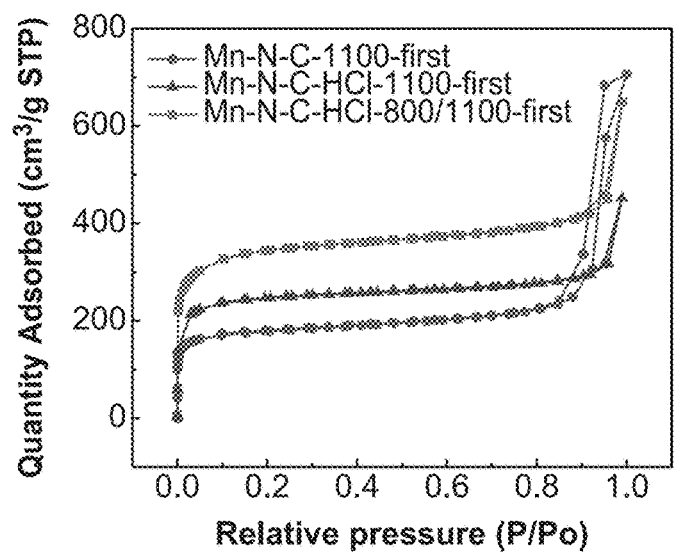
FIG. 4A is a graph depicting $N_2$ adsorption/desorption for the Mn—N—C—HCl-800/1100-first, Mn—N—C-1100-first, and Mn—N—C—HCl-1100-first catalysts discussed in Example 1.
Figure 4B:
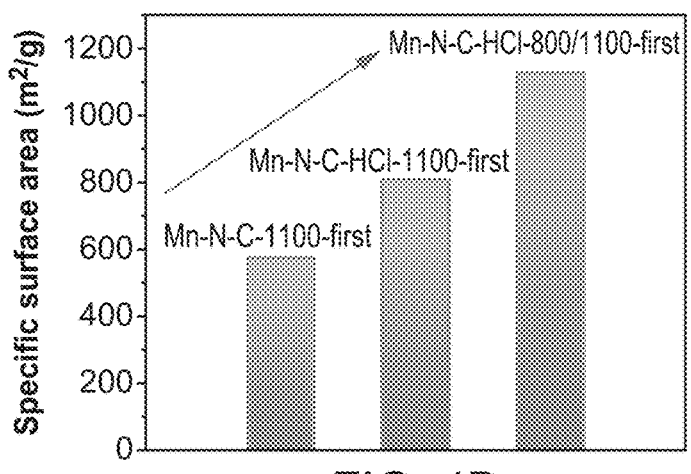
FIG. 4B is a graph depicting specific surface area for the Mn—N—C—HCl-800/1100-first, Mn—N—C-1100-first, and Mn—N—C—HCl-1100-first catalysts of Example 1.
Figure 4C:
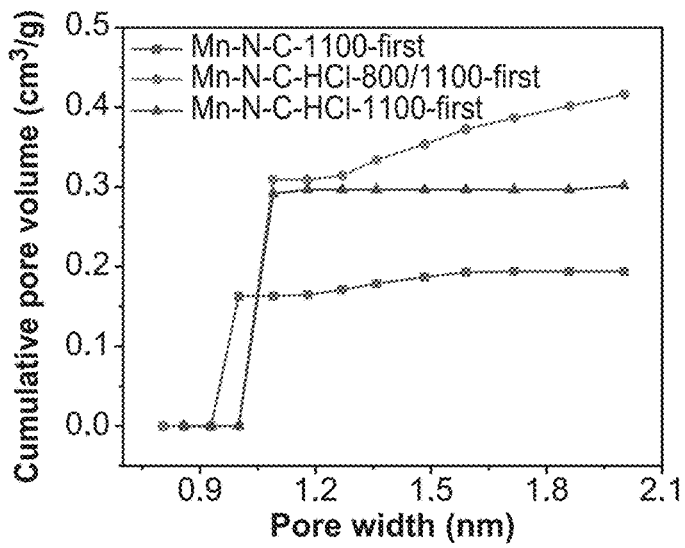
FIG. 4C is a graph depicting cumulative micropore volume for the Mn—N—C—HCl-800/1100-first, Mn—N—C-1100-first, and Mn—N—C—HCl-1100-first catalysts of Example 1.

Referring back to FIG. 2, the Mn-doped ZIF-8 catalyst precursors of the present invention then can be carbonized to create a porous carbon structure by evaporating zinc easily, and $MnN_4$ can be created via the high-temperature treatment. Thus, the thermal activation process has a profound effect on the activity of the ZIF-derived Mn—N—C catalysts. A multistep-pyrolysis strategy (i.e, 800° C. and 1100° C.) was developed to significantly increase the density of active sites located in the micropores. For example, if the temperature is directly increased to 1100° C., skipping the intermediate 800° C. step, a loss of $MnN_4$ sites will occur due to the collapse of certain micropores. As displayed in FIGS. 4A through 4C, the specific surface area of different catalysts follows this trend: Mn—N—C—HCl-800/1100-first>Mn—N—C—HCl-1100-first>Mn—N—C-1100-first, implying that the acid-assisted step-pyrolysis method can effectively increase the surface area. The Mn—N—C—HCl-800/1100-first catalyst exhibited higher micropore volume within a broader range than the other two catalysts due to less micropore collapse.

Figure 5:
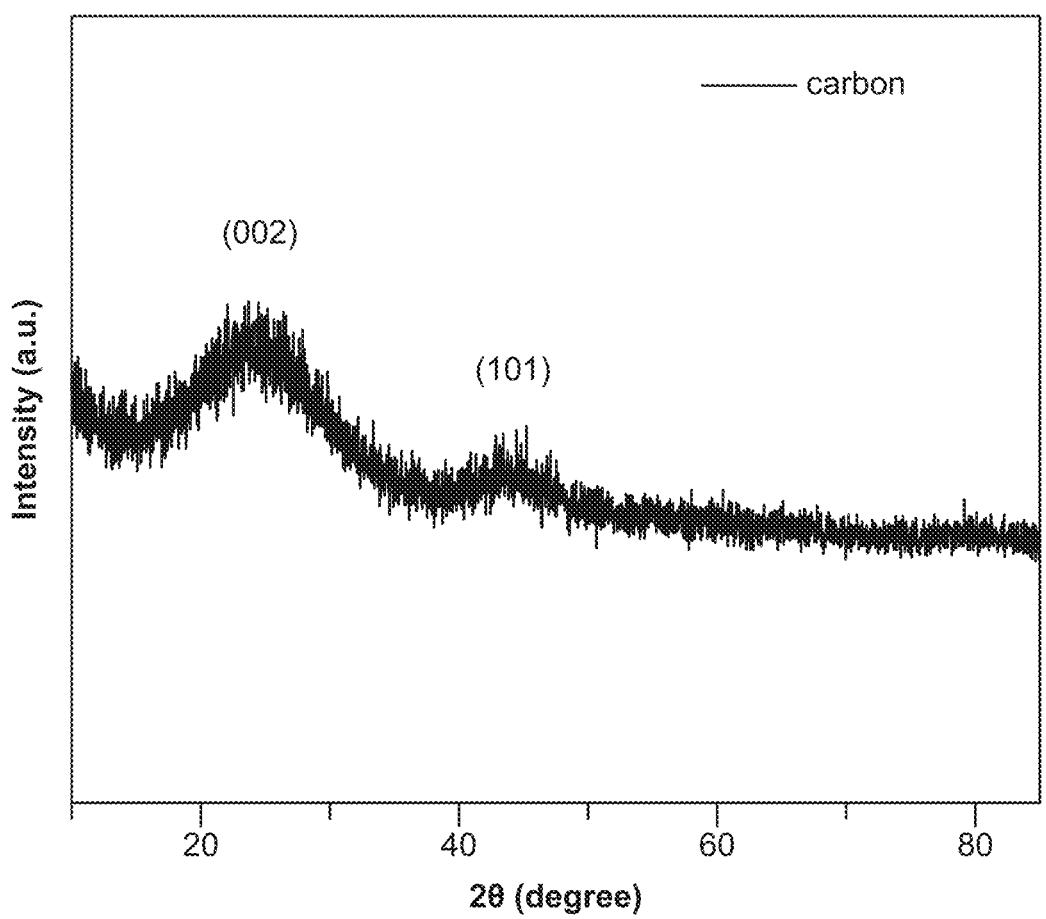
FIG. 5 is an X-ray diffraction pattern for a carbonized Mn—N—C catalyst, as discussed in Example 1.
Figure 6:
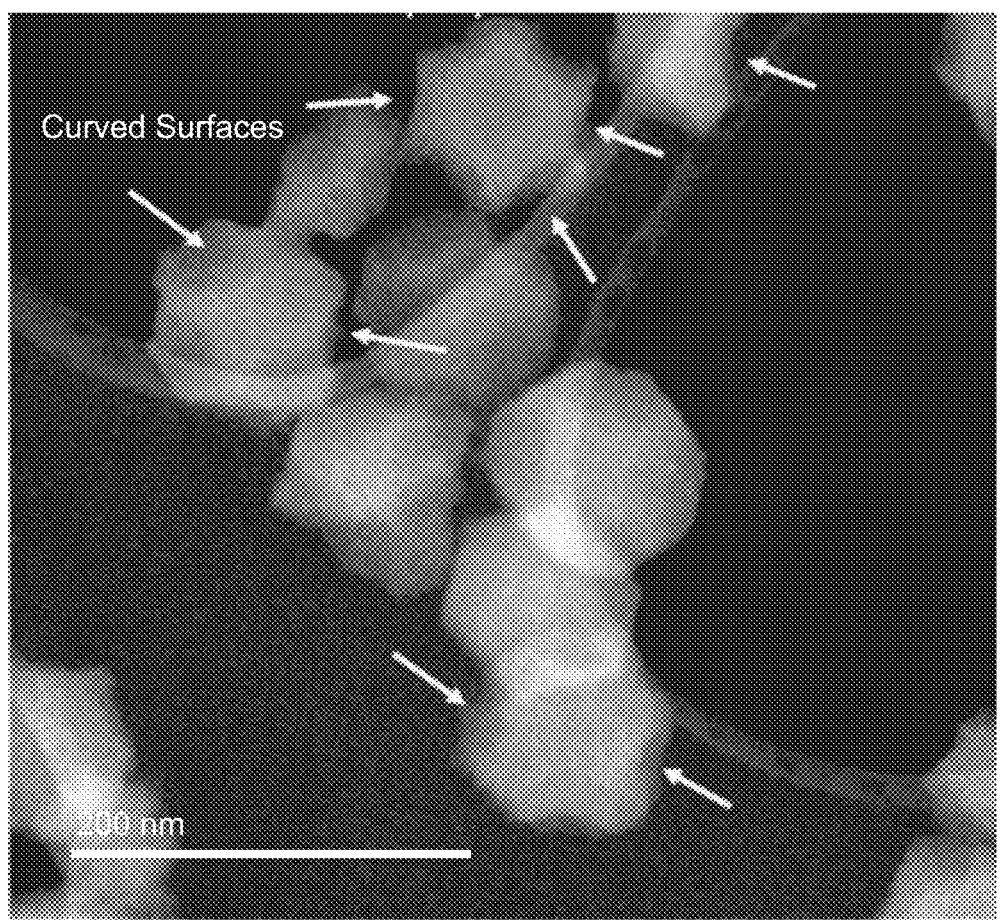
FIG. 6 is a scanning transmission electron microscopy (STEM) image of an Mn—N—C catalyst prepared according to the present invention.

As can be seen in FIG. 5, the XRD pattern of the obtained catalyst shows dominant peaks around 25° and 44°, which can be assigned to carbon planes (002) and (101), respectively, suggesting that the Mn/ZIF precursors are well carbonized. Referring now to FIG. 6, unlike the smooth surface often observed in catalysts from organic synthesis, a curved-surface polyhedron morphology of carbon particles is apparent in the catalyst obtained from the aqueous-based synthesis method of the present invention. This curved surface morphology was created by the anisotropic thermal shrinkage of ZIF-8, where the vertices of the polyhedron are less stressed than the planar faces. Compared to organic solvents used for the synthesis, the much faster crystallization process in the aqueous solvent can lead to the formation of more defects, e.g., absence of nodes or linkers. Thus, additional pore sizes are observed in the framework architecture and provide more space for the shrinkage of the ZIF-8 crystal. Consequently, the edge frame of the polyhedron is retained while the planar faces collapse. This curved surface structure can improve the utilization of active sites at the surface by increasing the external surface area and exposing more active sites. It can also facilitate the mass transport by generating more mesopores and macropores.

Unlike traditional Fe or Co-based catalysts, the Mn-based catalysts of the present invention are very likely to form clusters during a single-step chemical doping, thus generating a relatively low density of $MnN_4$ active sites. To address this issue, the present inventors have developed an effective two-step doping and adsorption method to introduce more active Mn sites into the carbon catalysts. Referring back to FIG. 2, this two-step approach can be seen, wherein, following the first thermal activation, the catalyst of the present invention may be subjected to an adsorption of Mn ions, followed by a second thermal activation. It is believed that the unique microporous structure and proper nitrogen doping of ZIF-derived carbon after the first step can serve as an ideal host to adsorb Mn ions sites in the second adsorption step, thereby increasing the density of $MnN_4$ sites. This is confirmed by scanning transmission electron microscopy (STEM)-energy-dispersive X-ray spectroscopy (EDS), which indicates that C, N, and Mn atoms are uniformly dispersed in the above-described Mn—N—C—HCl-800/1100 catalyst. Notably, compared with the Mn—N—C—HCl-800/1100-first catalyst, the Mn signals became much denser and stronger in the final Mn—N—C—HCl-800/1100 catalyst, suggesting that the adsorption and second thermal activation step can considerably increase the density of Mn sites.

Example 2: Oxygen Reduction Reaction Activity and Stability

Figure 7:
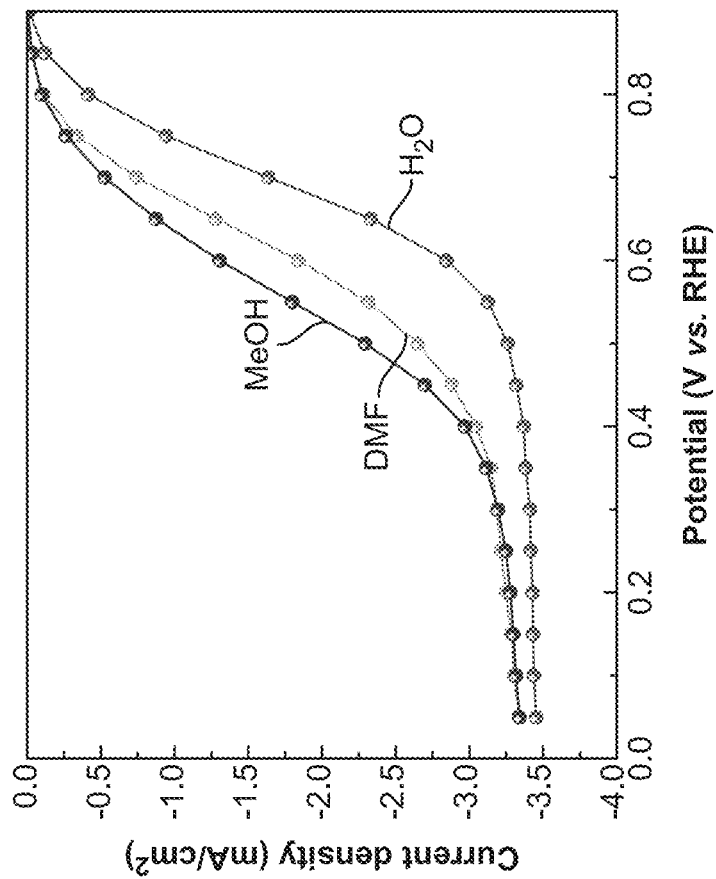
FIG. 7 is a graph comparing the oxygen reduction reaction polarization curves of Mn—N—C catalysts obtained from three different solvents, namely, water, methanol, and dimethyl formamide.

The oxygen reduction reaction activity and selectivity of some of these catalysts were evaluated by using a rotating ring-disk electrode (RRDE) in a 0.5 M $H_2SO_4$ electrolyte at room temperature. As can be seen in FIG. 7, a lower activity was observed for the Mn—N—C catalysts that were derived from methanol and dimethyl formamide (DMF) than from water. This suggests many fewer active $MnN_x$ moieties in the methanol-derived and DMF-derived catalysts and that Mn ions cannot be chemically doped into ZIF crystals easily. Unlike traditional catalysts prepared using organic solvents, in which the Mn ions cannot coordinate with N ligands effectively during the chemical doping step, the Mn—N—C—HCl-800/1100-first catalyst of the present invention, which is derived from direct Mn-doped ZIF-8 in aqueous solution, showed a more positive half-wave potential ($E_{1/2}$) of 0.69 V vs. RHE in 0.5 M $H_2SO_4$. It is believed that this is because $H_2O$ molecules partially break the coordination bonds between organic linkers and zinc nodes during nucleation and crystallization, exposing the unsaturated N sites for bonding with Mn ions. Thus, by using an aqueous solution to prepare an Mn—N—C catalyst, more Mn ions can be coordinated with N sites to obtain a higher density of Mn—$N_4$ complexes.

Figure 8:
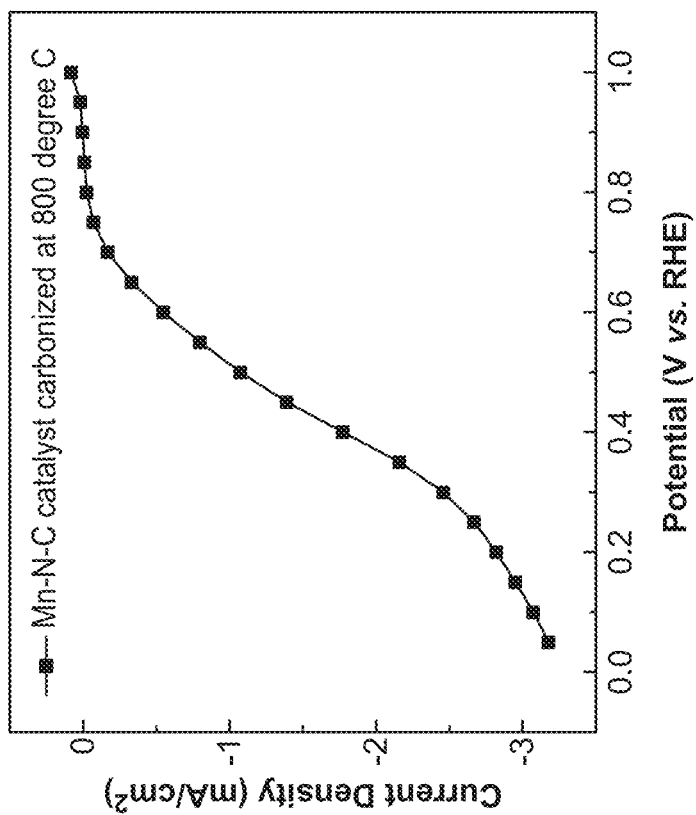
FIG. 8 is a graph depicting the oxygen reduction reaction polarization curve of an Mn—N—C catalyst carbonized at 800° C. according to the present invention.
Figure 9F:
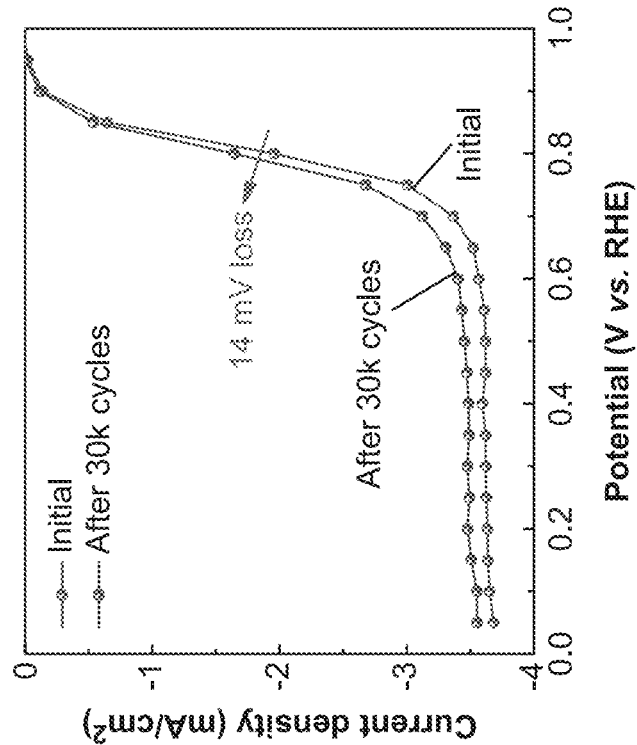
FIG. 9F is a graph depicting the steady-state oxygen reduction reaction polarization curves of an Mn—N—C—HCl-800/1100 catalyst prepared according to the present invention, before and after potential cycling tests (0.6-1.0 V, 30,000 cycles)
Figure 9E:
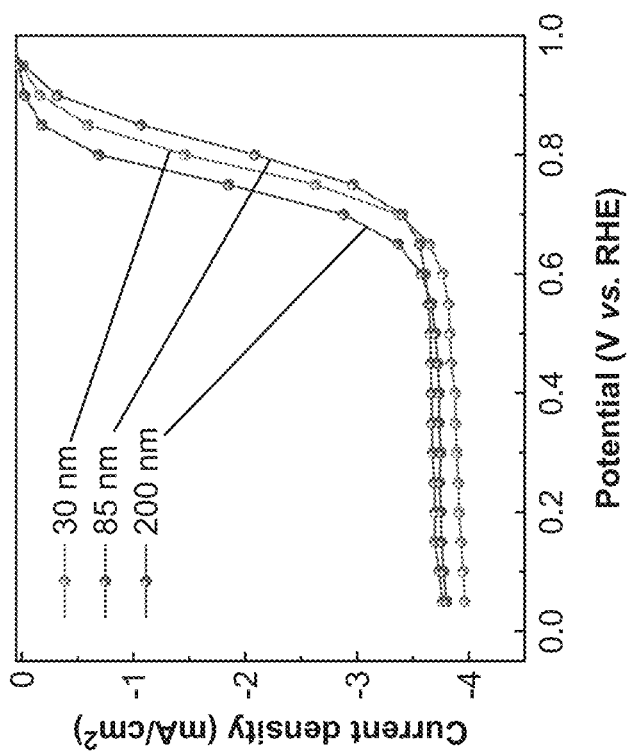
FIG. 9E is a graph depicting the steady-state oxygen reduction reaction polarization curves of Mn—N—C catalysts of various particle sizes prepared according to the present invention.
Figure 10B:
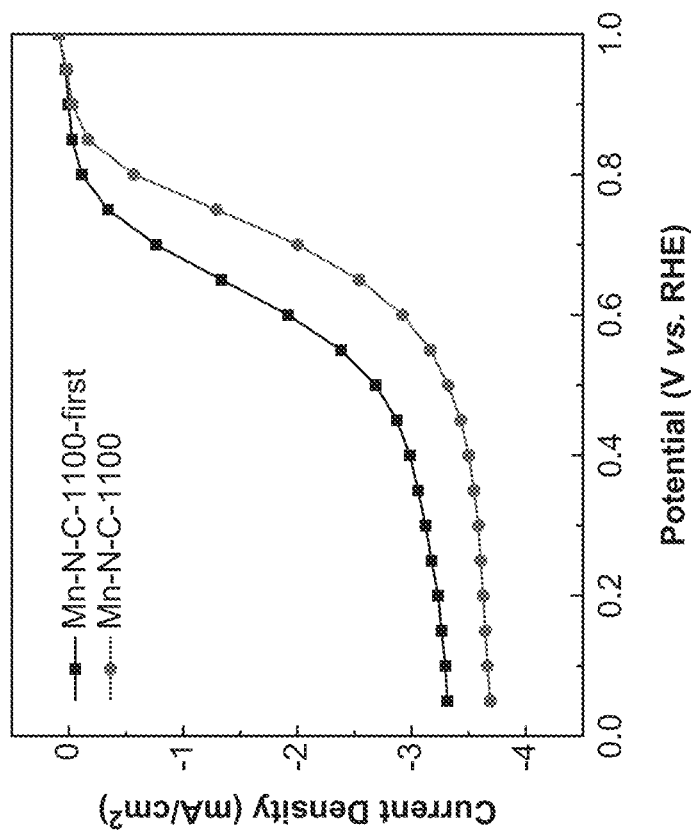
FIG. 10B is a graph depicting rotating disk electrode results of Mn—N—C-1100-first and Mn—N—C-1100 catalysts prepared according to the present invention.
Figure 10A:
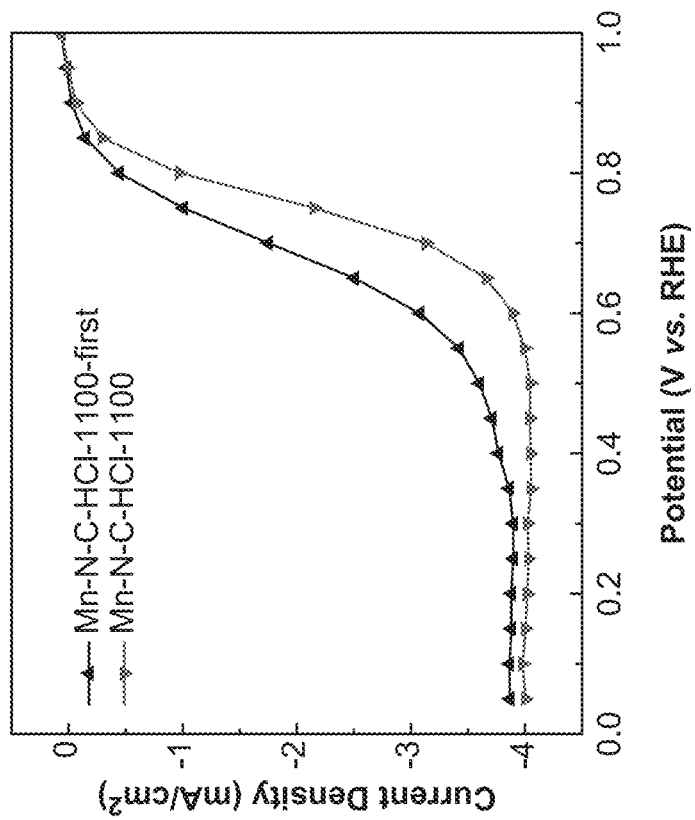
FIG. 10A is a graph depicting rotating disk electrode results of Mn—N—C—HCl-1100-first and Mn—N—C—HCl-1100 catalysts prepared according to the present invention.

Notably, zinc in ZIF-8 catalyst precursors starts to evaporate under 800° C. to generate a porous structure. Therefore, 800° C. was chosen as a preferred temperature for the carbonization of Mn-doped ZIF-8 catalyst precursors in the first step of the multistep-pyrolysis process. As can be seen in FIG. 8, the poor RDE performance indicates that there is no formation of $MnN_x$ active sites during the first step of the multistep-pyrolysis. However, after the first step of the multistep-pyrolysis, nitrogen defects were exposed due to zinc evaporation. Then, in the second step of the multistep-pyrolysis, the temperature was further elevated to 1100° C. to facilitate the diffusion of Mn ions and the generation of $MnN_4$ active sites. As can be seen in FIGS. 9A through 9F, particularly FIG. 9A, by following this first thermal activation with adsorption and a second thermal activation, the Mn—N—C—HCl-800/1100 catalyst showed significantly enhanced activity as compared to the Mn—N—HCl-800/1100-first catalyst, proving that more accessible active sites were introduced. This improvement in activity is in good agreement with the results of STEM-EDS mapping showing an increased atomic Mn signal in the final catalyst. As can be seen in FIGS. 10A and 10B, the adsorption and the second thermal activation steps can dramatically improve the activity for all Mn catalysts.

Figure 11:
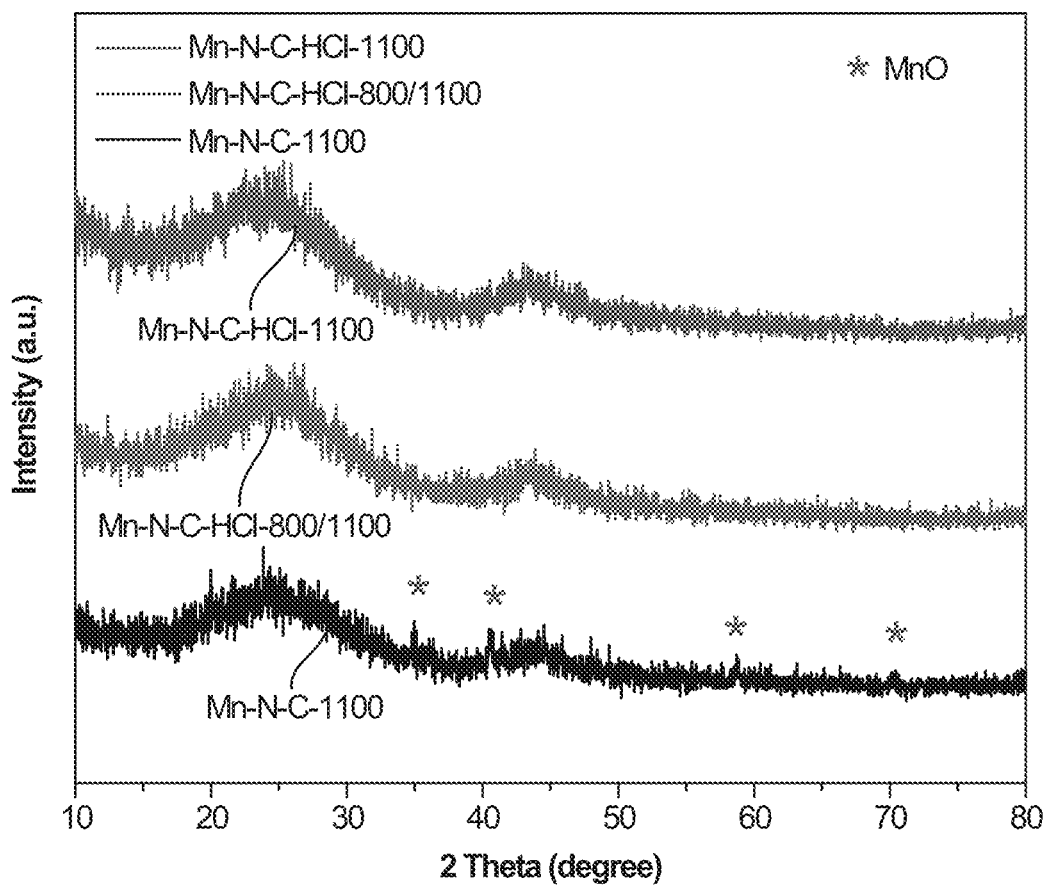
FIG. 11 is a graph depicting X-ray diffraction (XRD) patterns for Mn—N—C-1100, Mn—N—C—HCl-1100, and Mn—N—C—HCl-800/1100 catalysts prepared according to the present invention.
Figure 12A:
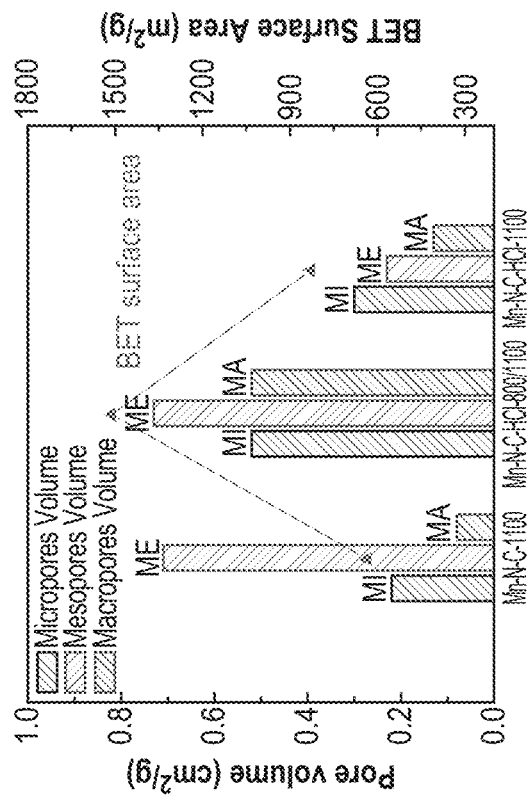
FIG. 12A is a graph depicting $N_2$ sorption isotherms of Mn—N—C-1100, Mn—N—C—HCl-1100, and Mn—N—C—HCl-800/1100 catalysts prepared according to the present invention.
Figure 12B:
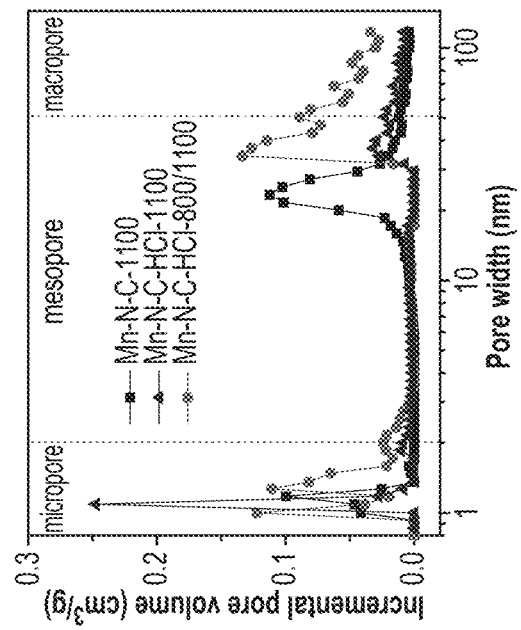
FIG. 12B is a graph providing a comprehensive comparison of Brunauer-Emmett-Teller (BET) surface areas and porosity for Mn—N—C-1100, Mn—N—C—HCl-1100, and Mn—N—C—HCl-800/1100 catalysts prepared according to the present invention.
Figure 12C:
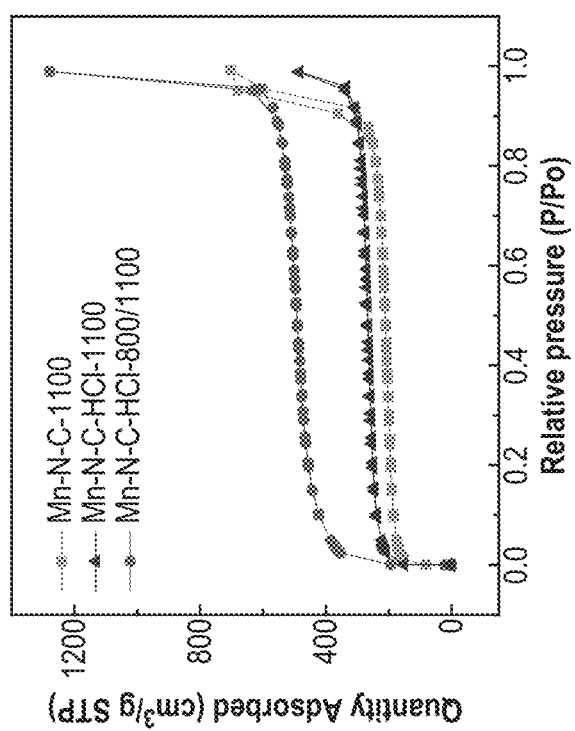
FIG. 12C is a graph depicting the pore size distribution of Mn—N—C-1100, Mn—N—C—HCl-1100, and Mn—N—C—HCl-800/1100 catalysts prepared according to the present invention.

Referring back now to FIG. 9B, the Mn—N—C-1100 catalyst that was synthesized without the assistance of acids exhibited inferior oxygen reduction reaction activity due to the formation of manganese oxides (see FIG. 11). Such manganese oxides undermined the surface area, as can be seen from FIGS. 12A through 12C and FIG. 13, and inhibited the formation of $MnN_4$ active sites. By contrast, with acid assistance, the Mn—N—C—HCl-1100 catalyst showed improved activity, which can be attributed to the higher density of active sites and a more porous structure. No manganese oxides/clusters were detected in the Mn—N—C—HCl-1100 catalyst, indicating that the acid plays an important role in isolating the Mn ions and in avoiding the formation of manganese oxides. The Mn—N—C—HCl-800/1100 catalyst showed the highest activity with an $E_{112}$ of 0.815 V vs. RHE as well as the highest surface area (>1500 $m^2 g^{-1}$). Micropore area is a key factor in improving oxygen reduction reaction activity by accommodating active sites. Therefore, the abundance of micropores (0.52 $cm^3 g^{-1}$) in the Mn—N—C—HCl-800/1100 catalyst is favorable for hosting a high density of active sites.

Figure 14A:
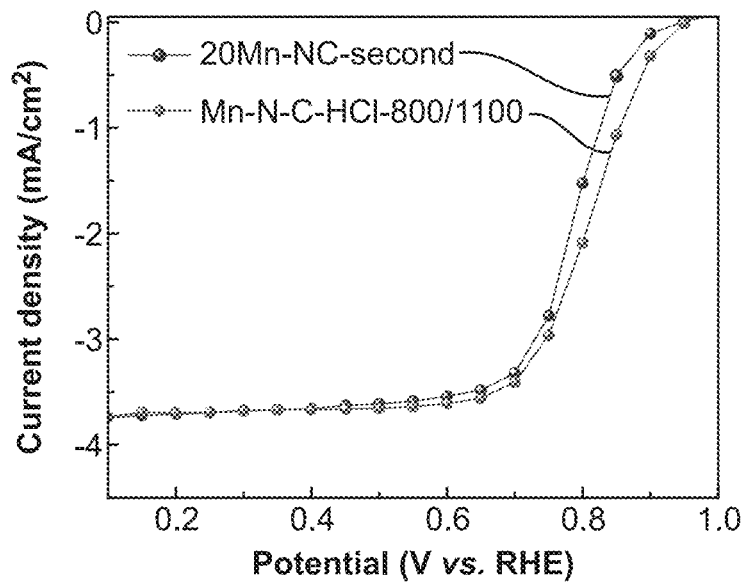
FIGS. 14A and 14B are graphs providing an activity comparison of a 20Mn—NC-second catalyst and an Mn—N—C—HCl-800/1100 catalyst prepared according to the present invention.
Figure 14B:
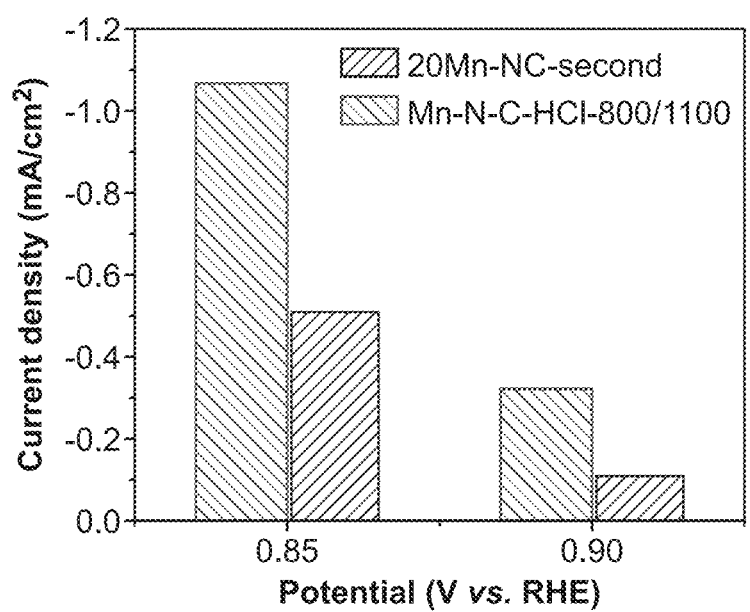

Referring now to FIGS. 14A and 14B, there are shown results of a comparison between a 20Mn—NC-second catalyst and an Mn—N—C—HCl-800/1100 catalyst of the present invention. The Mn—N—C—HCl-800/1100 catalyst exhibited a current density three times higher than that of the 20Mn—NC-second catalyst at 0.9 V. Given that less Mn content was observed for the Mn—N—C—HCl-800/1100 catalyst (see FIG. 15), the higher activity can be attributed to the higher utilization of $MnN_4$ moieties at the surface due to the uniquely curved-surface structure of the catalyst of the present invention. The activity of an Mn-free nitrogen-doped carbon (N—C) catalyst was also tested under the same conditions. As can be seen in FIG. 9B, such a catalyst only showed a half-wave potential around 0.53 V, suggesting that the formation of Mn-related active sites is essential for high oxygen reduction reaction activity. As shown in FIG. 9C and FIG. 16, Tafel slopes ranging from 75 to 85 mV $dec^{-1}$ were determined for Mn-based catalysts, suggesting that the mixed control on the rate-determining step involves the transfer of the first electron (60 mV $dec^{-1}$) and the diffusion of intermediates at catalyst surfaces (118 mV $dec^{-1}$). Among all Mn—N—C catalysts tested, the Mn—N—C—HCl-800/1100 catalyst showed the lowest Tafel slope, indicating the fastest oxygen reduction reaction kinetics. By contrast, the Mn-free nitrogen-doped carbon catalyst demonstrated a much higher Tafel slope (104 mV $dec^{-1}$) at low currents, indicating a different reaction mechanism and much slower kinetics. Moreover, the Mn—N—C—HCl-800/1100 catalyst yielded insignificant hydrogen peroxides (less than 3%) during the oxygen reduction reaction, suggesting good selectivity of the four-electron pathway (see FIG. 9D). Mn—N—C—HCl-800/1100 catalysts having different particle sizes were also prepared and compared, and those catalysts having a particle size of 85 nm demonstrated the highest performance (see FIG. 9E). This can be attributed to the fact that higher microporosity and specific surface area were observed for the 85 nm particle size catalyst, which, in turn, facilitated the exposure and utilization of active sites.

Figure 17:
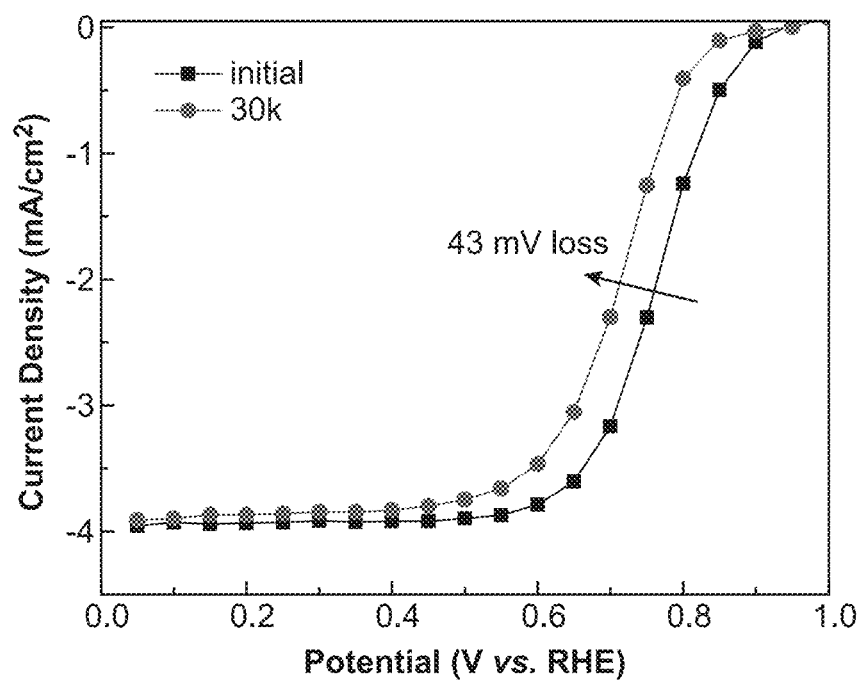
FIG. 17 is a graph depicting the steady-state oxygen reduction reaction polarization curves of an Mn—N—C—HCl-1100 catalyst prepared according to the present invention, before and after potential cycling tests.
Figure 18A:
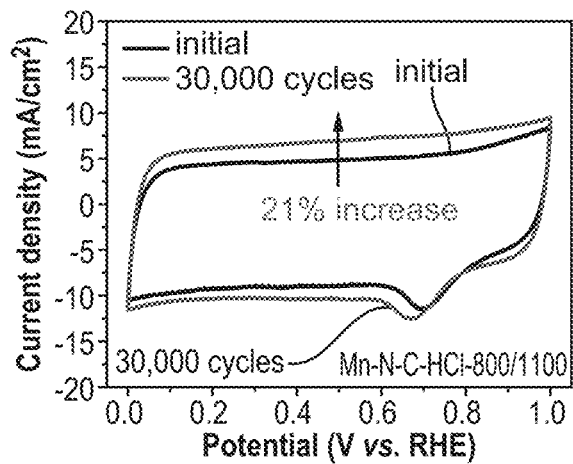
FIGS. 18A and 18B are graphs depicting cyclic voltammetry curves of Mn—N—C—HCl-800/1100 and Mn—N—C—HCl-1100 catalysts prepared according to the present invention, respectively, before and after potential cycling tests.
Figure 18B:
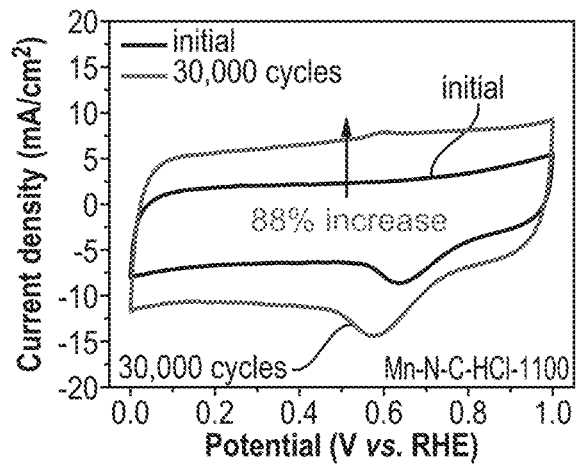
Figure 18C:
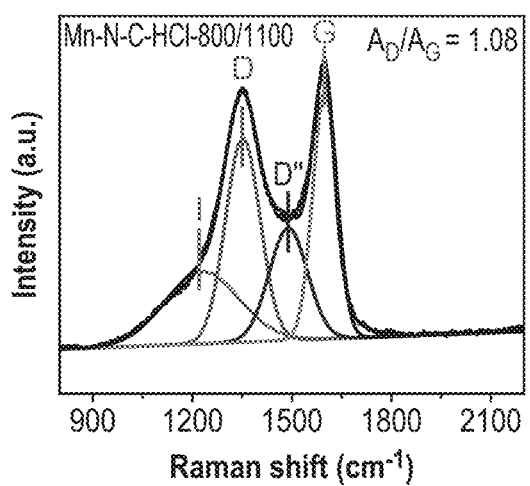
FIGS. 18C and 18D are Raman spectra of Mn—N—C—HCl-800/1100 and Mn—N—C—HCl-1100 catalysts prepared according to the present invention, respectively.
Figure 18D:
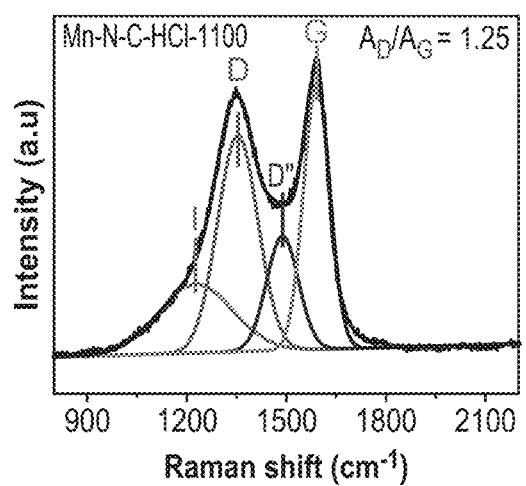

The stability of Mn-based catalysts was also evaluated via accelerated stress tests (potential cycling from 0.6 to 1.0 V) in $O_2$-saturated 0.5 M $H_2SO_4$ during the oxygen reduction reaction. The Mn—N—C—HCl-800/1100 catalyst demonstrated excellent stability with a loss of 14 mV in $E_{1/2}$ after 30,000 cycles (see FIG. 9F). The stability is significantly enhanced when compared to conventional ZIF-8 derived Fe—N—C and Co—N—C catalysts, indicating that the Mn—N—C catalyst of the present invention holds promise to address the stability issue associated with existing PGM-free oxygen reduction reaction catalysts. For comparison, the Mn—N—C—HCl-1100 catalyst (i.e., without multistep-pyrolysis in the first thermal activation) was subject to the identical stability test. As can be seen in FIG. 17, the Mn—N—C—HCl-1100 catalyst was found to be less stable, suggesting that the multistep-pyrolysis strategy can improve stability by modifying the carbon structure. FIGS. 18A through 18D provide a comparison of the Mn—N—C—HCl-1100 catalyst and the Mn—N—C—HCl-800/1100 catalyst and show less change of capacitance and a more graphitic carbon structure for the Mn—N—C—HCl-800/1100 catalyst due to the longer duration of heat-treatment and modulated temperature. In particular, it can be seen that the increase in capacitance for the Mn—N—C—HCl-800/1100 catalyst was around 21%, much less than that for the Mn—N—C—HCl-1100 catalyst (88%), suggesting an enhanced carbon oxidation resistance. In addition, the ratio of peak $Area_D/Area_G$ reduces from 1.26 in the case of Mn—N—C—HCl-1100 to 1.08 in the case of Mn—N—C—HCl-800/1100, indicating that multistep-pyrolysis can modify the carbon structure by promoting the graphitization degree.

Example 3: Mechanistic Understanding of Activity and Stability Improvements

Figure 19C:
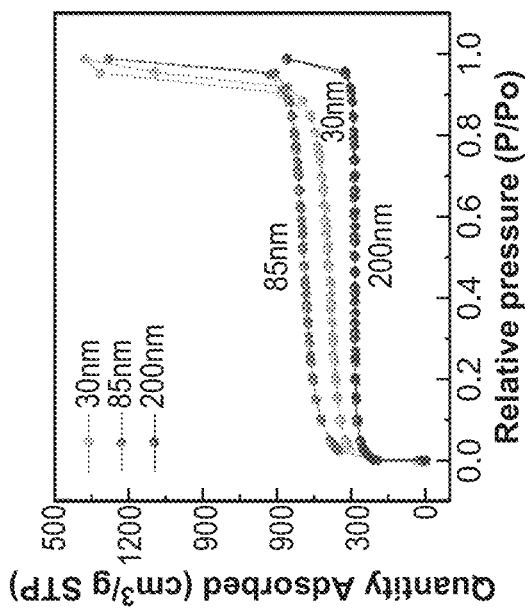
FIGS. 19A through 19C are graphs depicting X-ray diffraction patterns, Raman spectra, and $N_2$ sorption isotherms of Mn—N—C catalysts with various particle sizes prepared according to the present invention.
Figure 19B:
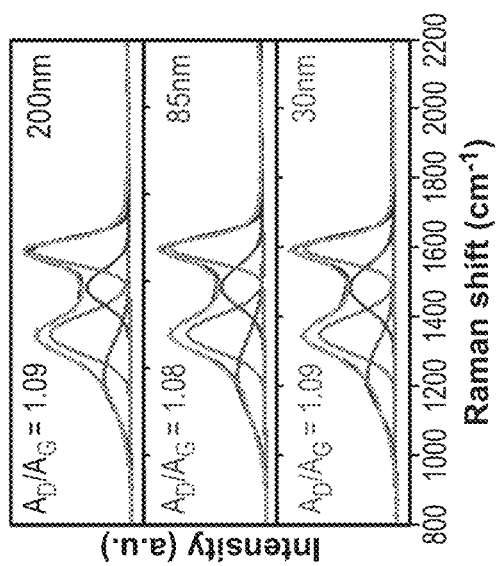
Figure 19A:
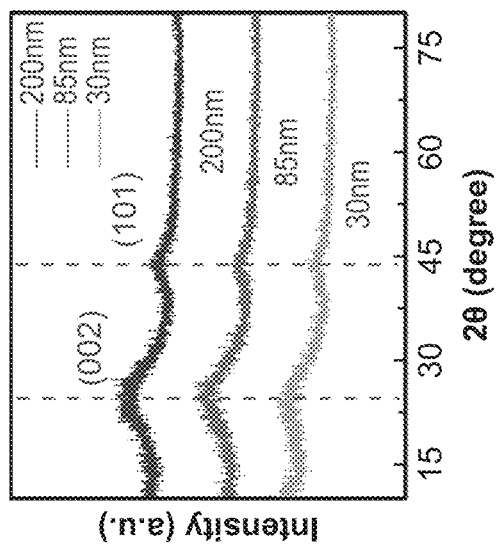
Figures 20, 21:
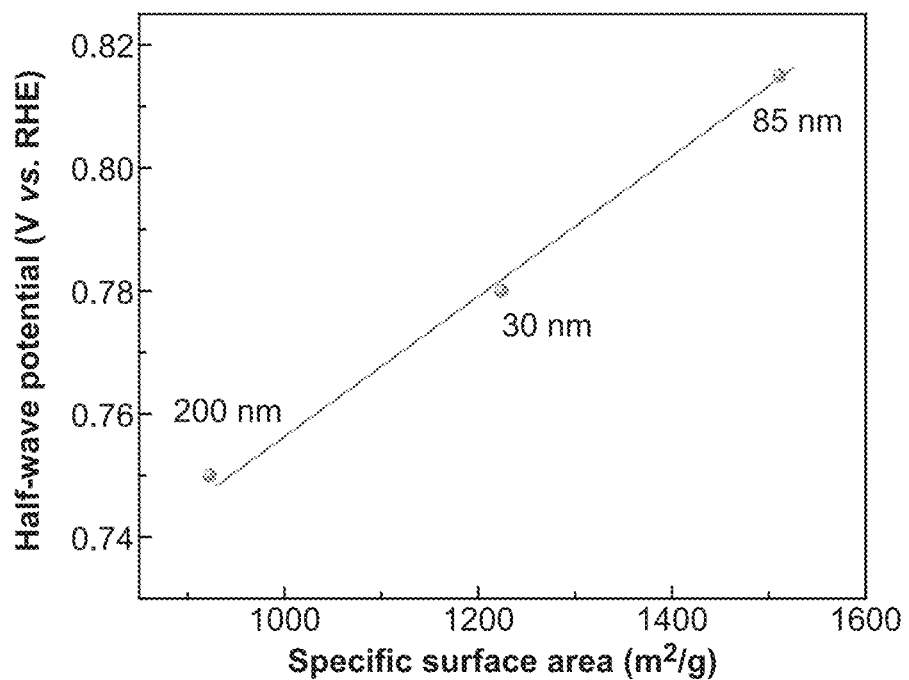
FIG. 20 is a graph depicting the correlation of BET surface area and catalytic activity of Mn—N—C catalysts of various particle sizes prepared according to the present invention.
FIG. 21 is a table providing pore size distribution and BET surface areas of Mn—N—C catalysts of different particle sizes prepared according to the present invention.

The dependence of electrochemical performance on catalyst particle size was investigated, and some of the results are shown in FIGS. 19A through 19C. More specifically, the particle size of Mn-doped ZIF catalyst precursors was tuned by varying the concentration of one or more reactants (in this case, the concentration of 2-methylimidazole). Thus, the particle size of various catalysts can be adjusted and prepared. After carbonization, the dominant rhombic polyhedron shape of Mn-doped ZIF-8 was retained, except that the catalyst particle size diminished, and the particle surface became irregular. After the adsorption and second thermal activation steps, the catalyst maintained a size similar to its size following the first thermal activation. As can be seen in FIG. 19A, X-ray diffraction results indicate that the Mn—N—C catalysts of different particle sizes showed a similar crystal carbon structure. As shown in the Raman spectra of FIG. 19B, all catalysts exhibited similar ratios of D and G peak areas ($Area_D/Area_G$), where the ratio of the relative intensity of D to G band can be an indicator of the graphitization degree of the carbon structure. The $N_2$ sorption isotherms of these Mn—N—C catalysts (shown in FIG. 19C), which are used to determine the respective Brunauer-Emmett-Teller (BET) surface areas, provide a discerning factor for catalytic activity. As shown in FIG. 9E, the catalytic activity of Mn catalysts follows a trend: 85 nm>30 nm>200 nm, which is consistent with the trend of specific surface area. The high surface area can be mainly ascribed to the dominant microporosity, evidenced by the gradual increase in the $N_2$ uptake at low pressures. The best performing catalyst, namely, the 85 nm particle size catalyst, also exhibited the highest surface area (1511 $m^2$ $g^1$). The 200 nm particle size catalyst demonstrated the lowest activity with a surface area of 923 $m^2$ $g^1$. The catalytic activity, surface areas, and particle sizes are well correlated in FIGS. 20 and 21.

The atomic-level structure and the chemistry of Mn—N—C catalysts of the present invention were extensively studied by scanning transmission electron microscopy (STEM) images, electron energy loss spectroscopy (EELS), and X-ray absorption spectroscopy (XAS) analysis. The Mn—N—C—HCl-800/1100-first catalyst exhibits a curved surface polyhedron structure. An advanced electron microscopy study verifies that atomically dispersed Mn sites are homogeneously embedded in the carbon matrix throughout the catalyst.

Figure 22A:
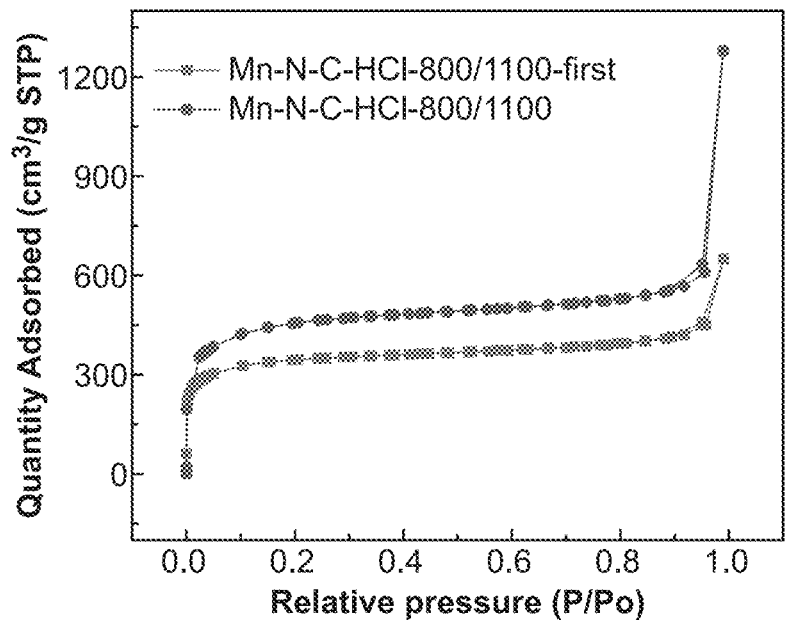
FIGS. 22A and 22B are graphic representations of the $N_2$ adsorption/desorption plots and of the BET surface area/micropore volumes, respectively, of Mn—N—C—HCl-800/1100-first and Mn—N—C—HCl-800/1100 catalysts prepared according to the present invention.
Figure 22B:
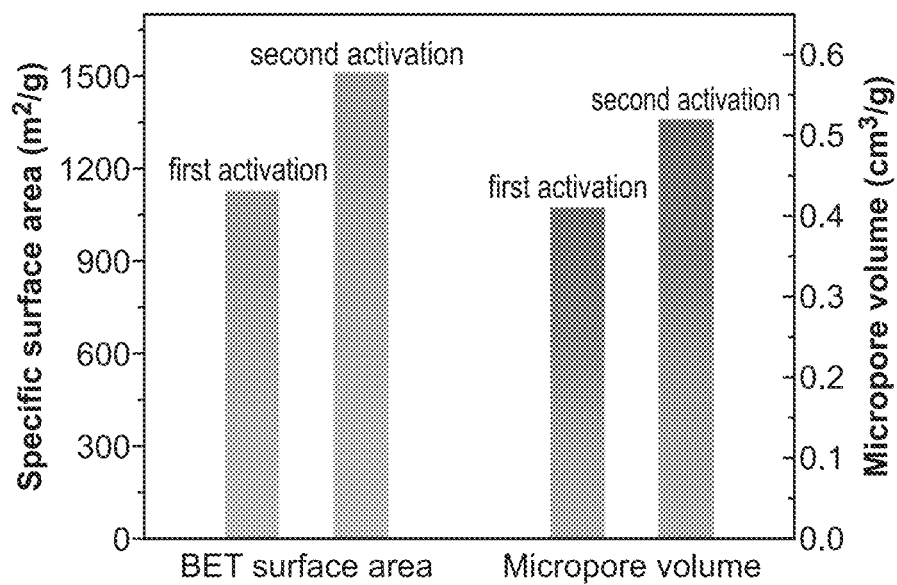

As noted above, the Mn—N—C—HCl-800/1100-first catalyst was subsequently subjected to an adsorption step and a second thermal activation, where acid and urea were introduced to prevent the formation of Mn oxides/clusters and to provide a source of additional nitrogen, respectively. Hydrochloric acid can also activate the catalyst by improving the BET surface area and pore volume of carbon. HR-TEM images with electron diffraction patterns confirm the existence of a porous carbon structure, and the absence of Mn oxides or clusters in the catalysts, which are in good agreement with XRD results. Also, compared to the Mn—N—C—HCl-800/1100-first catalyst, the curved surface morphology of the Mn—N—C—HCl-800/1100 catalyst became more dominant, and a more porous structure was achieved. The increased surface area can be attributed to the fact that the more dominant micropores were created after the adsorption and the second thermal activation (see FIGS. 22A and 22B), which result is related to the pore formation induced by the treatments with HCl and urea. This is different from results we observed previously, in which the specific surface area of catalysts was often reduced after the second thermal activation. It is believed that the higher micropore volume can accommodate more $MnN_4$ active sites in the second step, which has been verified by oxygen reduction reaction activity enhancement and STEM elemental mapping. The ammonia generated from the decomposition of urea could help to create more defects, thus increasing the density of $MnN_4$ sites. The atomically dispersed nitrogen-coordinated manganese sites in the final catalyst were also verified via high-resolution scanning transmission electron microscopy (HR-STEM) and electron energy loss spectroscopy (EELS). Therefore, the improved oxygen reduction reaction activity is due to increased surface area and density of $MnN_4$ active sites.

Figure 23A:
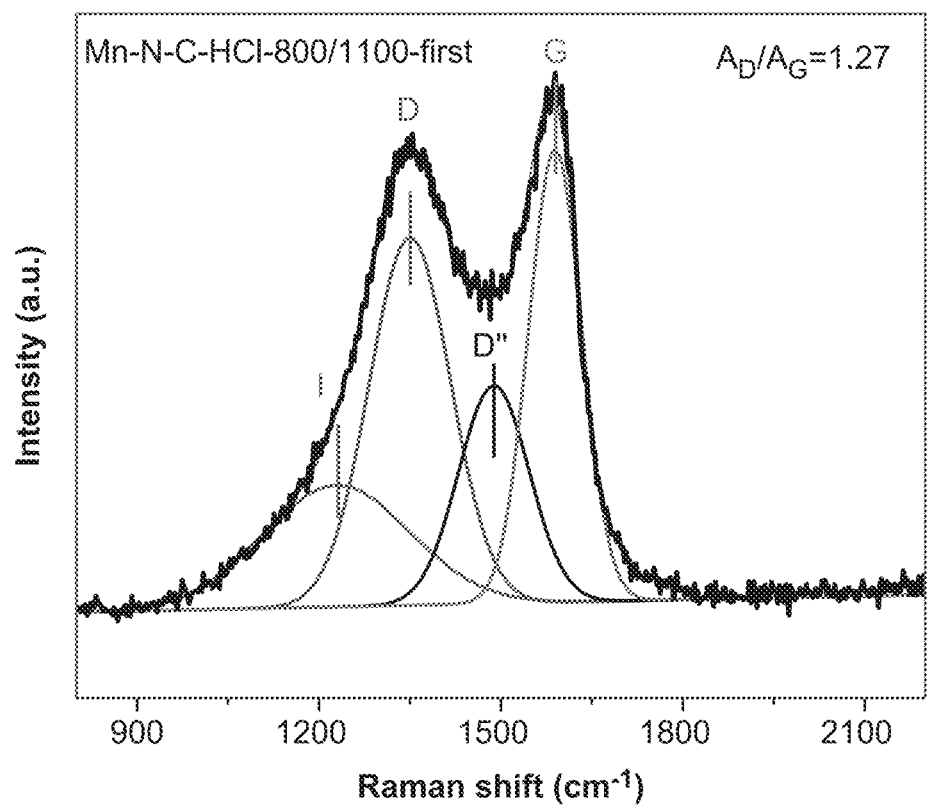
FIGS. 23A and 23B are Raman spectra for an Mn—N—C—HCl-800/1100-first catalyst and an Mn—N—C—HCl-800/1100 catalyst, respectively, prepared according to the present invention.
Figure 23B:
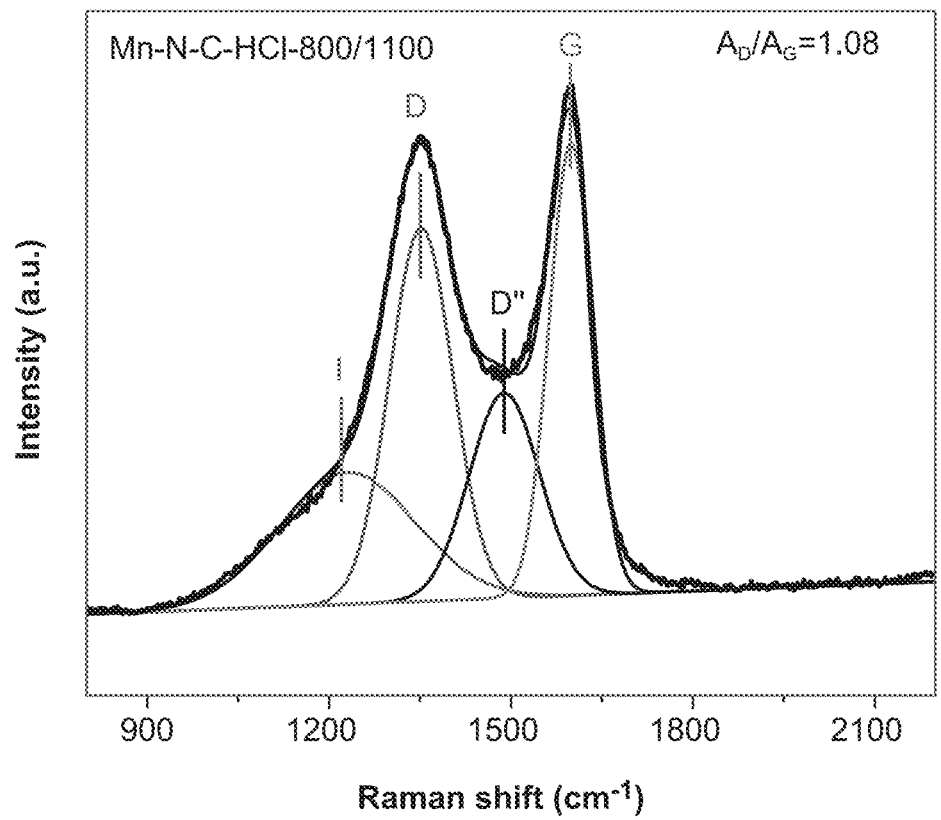

The best performing Mn—N—C—HCl-800/1100 catalyst after the accelerated stress test was further studied by applying high-angle annular dark-field scanning transmission electron microscopy (HADDF-STEM), and the images (not shown) provide an underlying mechanistic understanding of stability enhancement. The curved surface of carbon architecture was retained after 30,000 potential cycles, suggesting excellent stability of catalysts in terms of carbon corrosion resistance. The carbon stability can be attributed to the formation of a curvature-shaped graphitic carbon structure. These graphitic carbon layers stacked in the Mn—N—C—HCl-800/1100 catalyst are possibly related to the step-pyrolysis method and are further enhanced by the second thermal activation as the Mn—N—C—HCl-800/1100 catalyst shows a more dominant graphitic carbon structure when compared to the Mn—N—C—HCl-800/1100-first catalyst (see FIGS. 23A and 23B).

The change of carbon structure was also confirmed by Raman spectroscopy, in which more graphitic carbon structures were detected from the Mn—N—C—HCl-800/1100 catalyst. The generation of such a high curvature graphitic carbon structure can start from 800° C. during the first step of the multistep-pyrolysis of the Mn-doped ZIF-8 catalyst precursor. Notably, in traditional synthesis methods, the heat-treatment duration is usually short. Therefore, the carbonization of the catalyst precursor is insufficient to generate such a graphitic carbon structure. With the present method, however, longer duration heat treatments, modulated temperature and/or the second thermal activation can all facilitate the formation of such unique graphitic carbon structures. After potential cycling, the atomically dispersed nitrogen-coordinated Mn sites were still retained in the carbon matrix, and no Mn clusters were observed, suggesting the robustness of the Mn—N coordination structure during the oxygen reduction reaction in acid media. This result is consistent with rotating disk electrode (RDE) observations.

Figure 24:
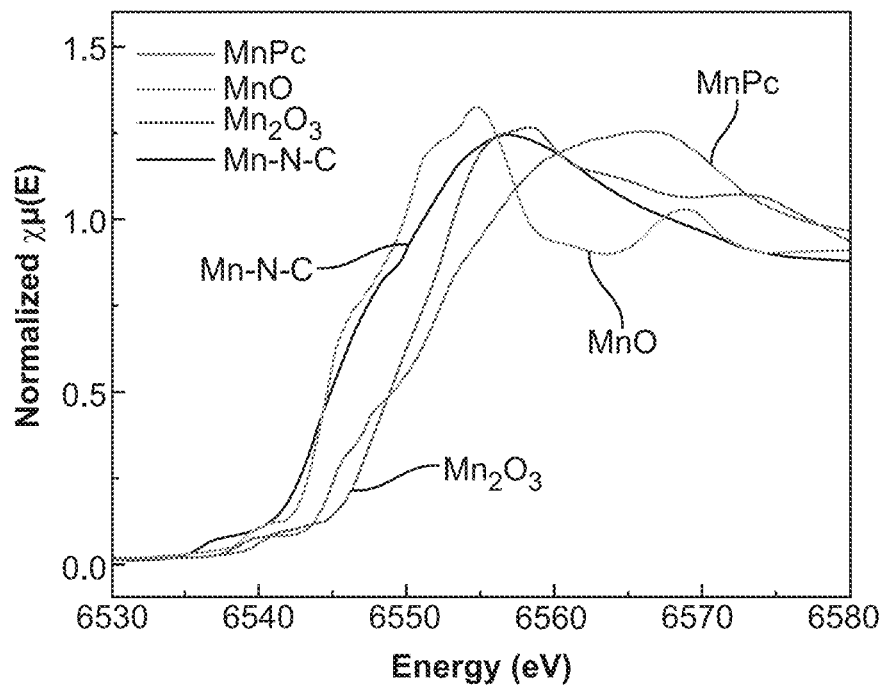
FIG. 24 is a graph depicting the K-edge X-ray absorption near edge structure (XANES) spectra of an Mn—N—C—HCl-800/1100 catalyst prepared according to the present invention and of standard samples (i.e., manganese phthalocyanine (MnPc), MnO, and $Mn_2O_3$)

X-ray absorption spectroscopy (XAS) measurements were used to further examine the subject Mn—N—C catalyst. Manganese phthalocyanine (MnPc), MnO, and $Mn_2O_3$ were also studied as standard Mn compounds for comparison. The bulk average oxidation state of the Mn in the Mn—N—C—HCl-800/1100 catalyst was estimated by the position of the X-ray absorption near-edge structure (XANES) spectra. FIG. 24 presents that edge position of the Mn K-edge XANES spectrum of the Mn—N—C—HCl-800/1100 catalyst nearly overlaps that of the MnO, indicating a bulk average oxidation state of +2. This is in good agreement with the XPS results shown in FIGS. 25A through 25D, where the valence of Mn ions of the Mn—N—C—HCl-800/1100 catalyst was identified to be $Mn^{2+}$ based on the binding energy of Mn $2p_{1/2}$ and Mn $2p_{3/2}$ situated at ca.

Figure 26:
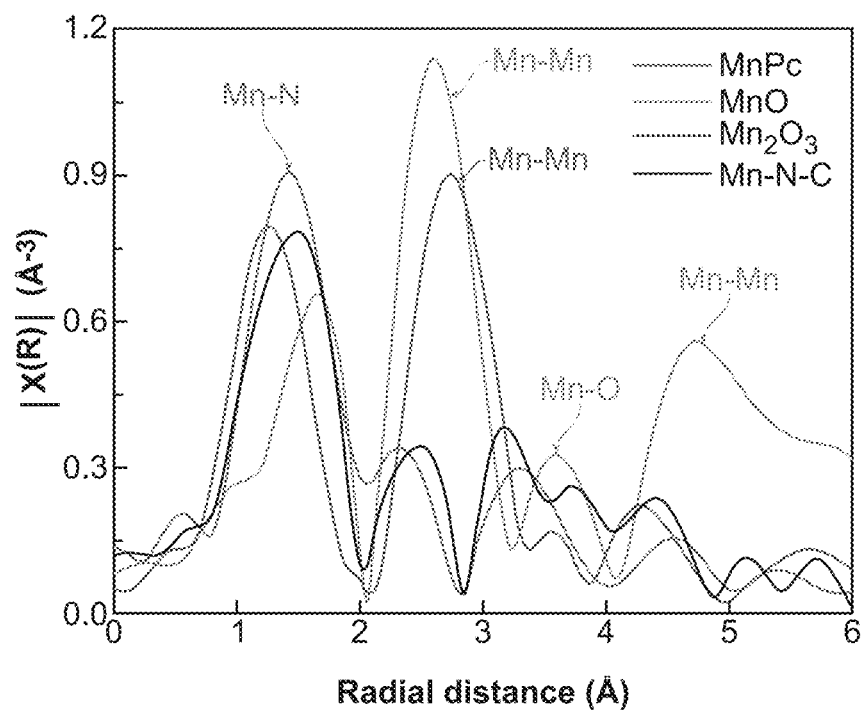
FIG. 26 is a graph depicting the Fourier-transform extended X-ray absorption fine structure (EXAFS) spectra of an Mn—N—C—HCl-800/1100 catalyst prepared according to the present invention and of standard samples (i.e., MnPc, MnO, and $Mn_2O_3$)
Figure 27B:
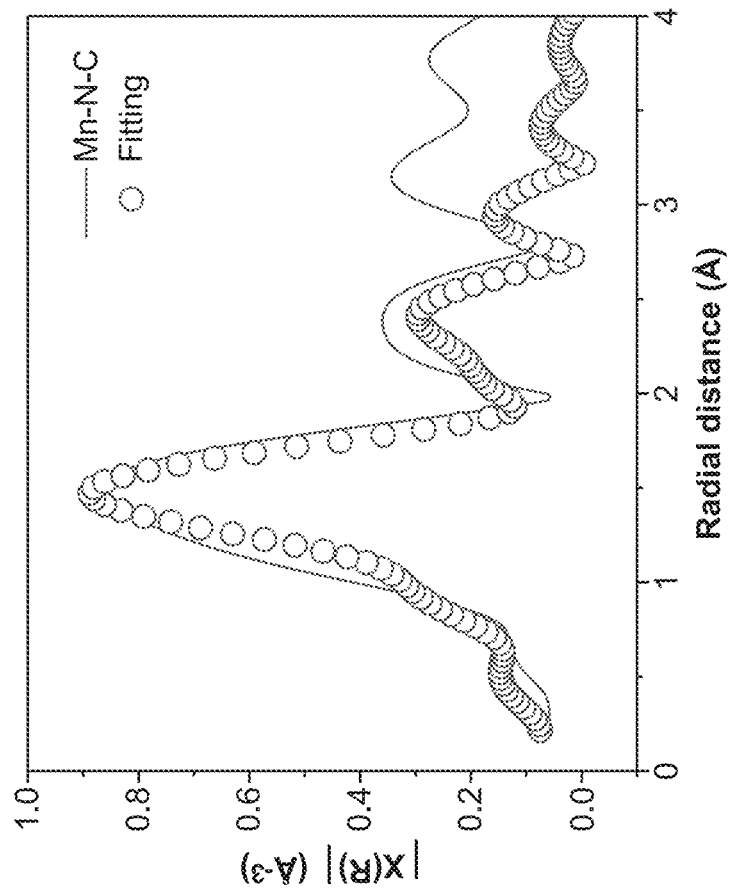
FIGS. 27A and 27B are graphs depicting EXAFS data fitting results of MnPc and an Mn—N—C—HCl-800/1100 catalyst prepared according to the present invention, respectively.
Figure 27A:
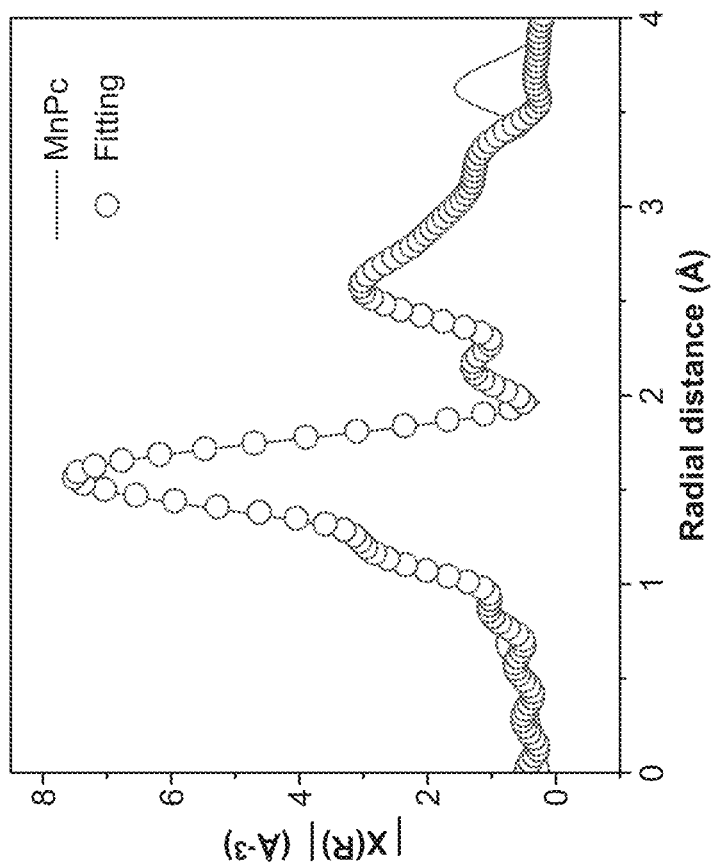

653.2 eV and 641.5 eV, respectively. The N is peak can be fitted into four peaks situated at 398.3 eV, 399.3 eV, 401.3 eV, and 404.0 eV, which can be assigned to pyridinic-N, Mn—N species, graphitic-N, and oxidized-N, respectively. The nitrogen content and types are similar to traditional iron-based catalysts (FIG. 15). The pyridinic nitrogen can act as anchor sites to coordinate with Mn sites. Moreover, the graphitic nitrogen was the dominant species observed in our catalysts, which can modify the electronic structure of carbon materials by delocalizing the electron distribution of carbon planes to improve the oxygen reduction reaction kinetics. Moreover, the d-orbital filling and spin of transition metal center can be significantly impacted by surrounding graphitic N, leading to the improved intrinsic activity of $MnN_4$ sites. The local structures of Mn sites in the Mn—N—C—HCl-800/1100 catalyst and standard Mn compounds were also characterized by an extended X-ray absorption fine structure (EXAFS) analysis. The Fourier-transformed (FT) EXAFS spectrum of the Mn—N—C—HCl-800/1100 exhibited a predominant peak of around 1.5 Å (see FIG. 26), which can be attributed to the Mn—N/O first coordination shell. The two scattering peaks of the MnO around 2.6 Å and 4.8 Å can be assigned to the Mn—Mn pathways. Thus, the absence of such Mn—Mn peaks for the Mn—N—C—HCl-800/1100 indicates no Mn oxides cluster with long-range ordered structures. The EXAFS analysis agrees with the XRD and STEM results that the Mn exists as atomically dispersed single Mn site species. To further understand the chemical structure of Mn—N coordination, we characterized MnPc with a fingerprint $MnN_4$ structure as a standard baseline for possible active site identification of the Mn—N—C—HCl-800/1100 catalyst (see FIGS. 27A, 27B and 28). In FIG. 28, CN is the coordination number; R is the bond distance; $\sigma^2$ is the mean-square disorder; $\Delta E_0$ is edge-energy shift (the difference between the zero kinetic energy value of the sample and that of the theoretical model). The single number in the bracket for R, $\sigma^2$, and $E_0$ is the last digit error, while the one in the bracket for CN is the full error. Manganese phthalocyanine was fit as a standard to determine the amplitude parameter to be used for the Mn—N—C fitting. It is noted that the FT-EXAFS of the Mn—N—C—HCl-800/1100 catalyst closely follows that of the MnPc up to 5 Å (see FIG. 26), suggesting the presence of $MnN_4$ moieties in the Mn—N—C—HCl-800/1100 catalyst. The presence of Mn—$O_x$ species cannot be conclusively excluded by XAS analysis since N and O as scattering neighbors cannot be distinguished by XAS, but the N coordination is supported by STEM and EELS analysis.

The present inventors have previously employed the first-principles density functional theory (DFT) calculations to predict the intrinsic oxygen reduction reaction activity of an $MnN_4$ site. The most likely active site contains a central Mn atom coordinated with four N atoms embedded in a graphene layer with a planar configuration. The $MnN_4$ site exhibits a thermodynamically favorable four-electron pathway for the oxygen reduction reaction with a predicted limiting potential of 0.54 V and kinetically feasible activation energy of 0.37 eV for breaking the O—O bond during the OOH dissociation. Hence, these computational results explain well the observed activity of the Mn—N—C catalysts for the oxygen reduction reaction. Here, we further performed the DFT calculations to model the metal leaching processes from both $MnN_4$ and $FeN_4$ sites to attain an understanding of the observed stability improvement of the Mn—N—C catalysts. Calculated Pourbaix diagrams show that these clean $MnN_4$ and $FeN_4$ sites are thermodynamically stable only under low electrode potential (U<0.5 V vs. RHE) in acid media. Under electrode potential higher than 0.5 V, the $MnN_4$ site was predicted to be terminated by an oxygen atom, whereas the $FeN_4$ site was predicted to be terminated by a hydroxyl group. The different stable states of the $MnN_4$ and $FeN_4$ sites during oxygen reduction reaction at high potential is a result of the lower thermodynamic driving force for O protonation reaction to form OH on $MnN_4$ than on $FeN_4$ site. The adsorption of an oxygen molecule ($O_2$) on the central metal of these active sites is the first and inevitable step of the oxygen reduction reaction.

Example 4: MEA Performance

Owing to the significant differences in temperature, acidity, pressure, proton/electron conductivity, and electrode structures between rotating disk electrodes (RDEs) and membrane electrode assemblies (MEAs), it is challenging to transfer high activities of PGM-free catalysts into MEA performance directly. Referring now to FIGS. 29A through 29F and, in particular, to FIG. 29A, fabricated MEAs using different catalysts of the present invention were investigated under the $H_2$—$O_2$ condition. More specifically, some of the test conditions under which fuel cell performance under $H_2$—$O_2$ was assessed were as follows: cathode—4.0 mg $cm^{-2}$; $O_2$ flow rate—1000 sccm; 100% RH; 1 bar $O_2$ partial pressure; anode—0.3 $mgp_t$ $cm^{-2}$ Pt/C; $H_2$ flow rate—200 sccm; 100% RH; membrane—Nafion® 212. Under these conditions, the Mn—N—C-1100 catalyst showed comparatively poor performance relative to the Mn—N—C—HCl-1100 and Mn—N—C—HCl-800/1100 catalysts in the whole current range due to the inferior intrinsic activity of Mn oxides, which also reduced the number of Mn—N active sites and blocked the micropores. Moreover, the Mn—N—C-1100 catalyst showed a tendency to agglomerate together with a smaller primary particle size, which can block the dispersion and distribution of ionomer. As compared to the Mn—N—C-1100 catalyst, the Mn—N—C—HCl-1100 catalyst exhibited improved performance in the whole current range, indicating that the removal of Mn oxides by using HCl can enhance the activity and change the carbon structure of the catalyst. However, the Mn—N—C—HCl-1100 catalyst also showed poor mass transport due to insufficient mesopores and macropores, even though primary particles of the Mn—N—C—HCl-1100 were well isolated and form less large aggregates. As compared to the Mn—N—C-1100 and Mn—N—C—HCl-1100 catalysts, the Mn—N—C—HCl-800/1100 catalyst showed significantly improved MEA performance. It achieved an open circuit voltage (OCV) of 0.95 V, which was comparable to that of our previously reported 20Mn—NC-second catalysts. Meanwhile, the achieved maximum power density of the Mn—N—C—HCl-800/1100 cathode was 0.6 W $cm^{-2}$, which was much higher than that of the 20Mn—NC-second catalyst (see FIG. 30). More importantly, the current density at 0.8 V for the Mn—N—C—HCl-800/1100 catalyst was about 1.5 times higher than that of the 20Mn—NC-second catalyst, indicating that more active sites were exposed and utilized under the same condition likely due to a more porous structure of the Mn—N—C—HCl-800/1100 catalyst.

Figures 29A, 29B:
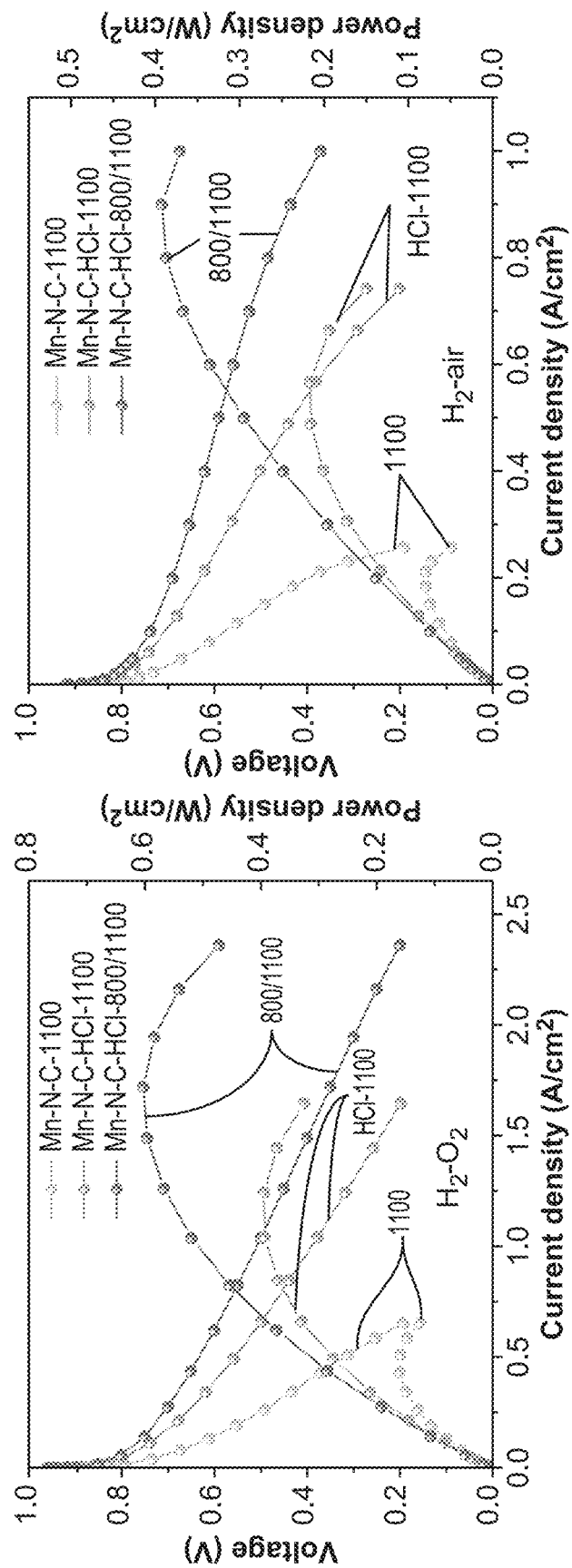
FIGS. 29A and 29B are graphs depicting the fuel cell performance of Mn—N—C-1100, Mn—N—C—HCl-1100, and Mn—N—C—HCl-800/1100 catalysts prepared according to the present invention under $H_2$—$O_2$ and $H_2$-air, respectively.
Figure 29E:
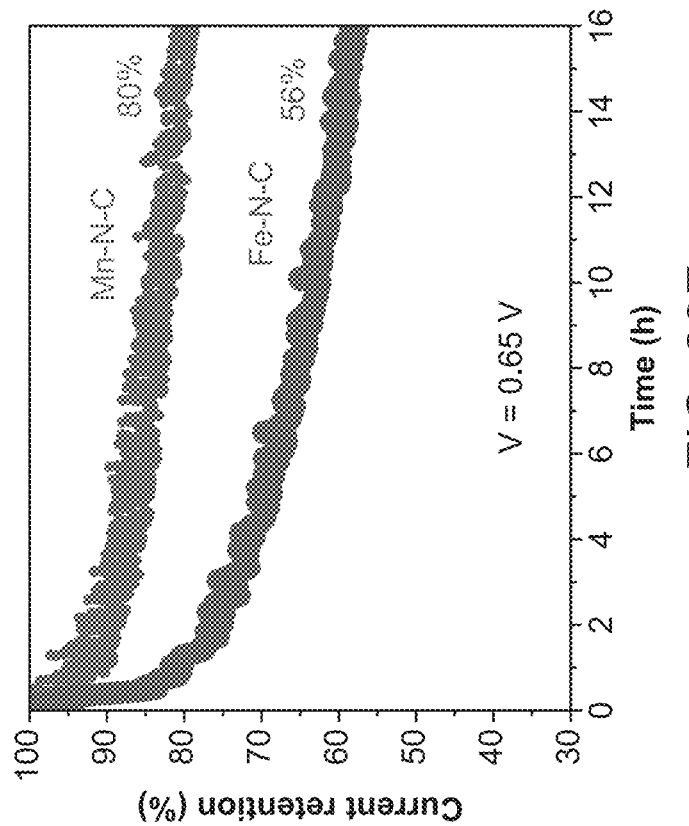
FIG. 29E is a graph depicting the maximum power density and current density of certain iron-free cathode catalysts for PEM fuel cells under $H_2$-air conditions at 80° C. and 100% relative humidity.
Figure 30:
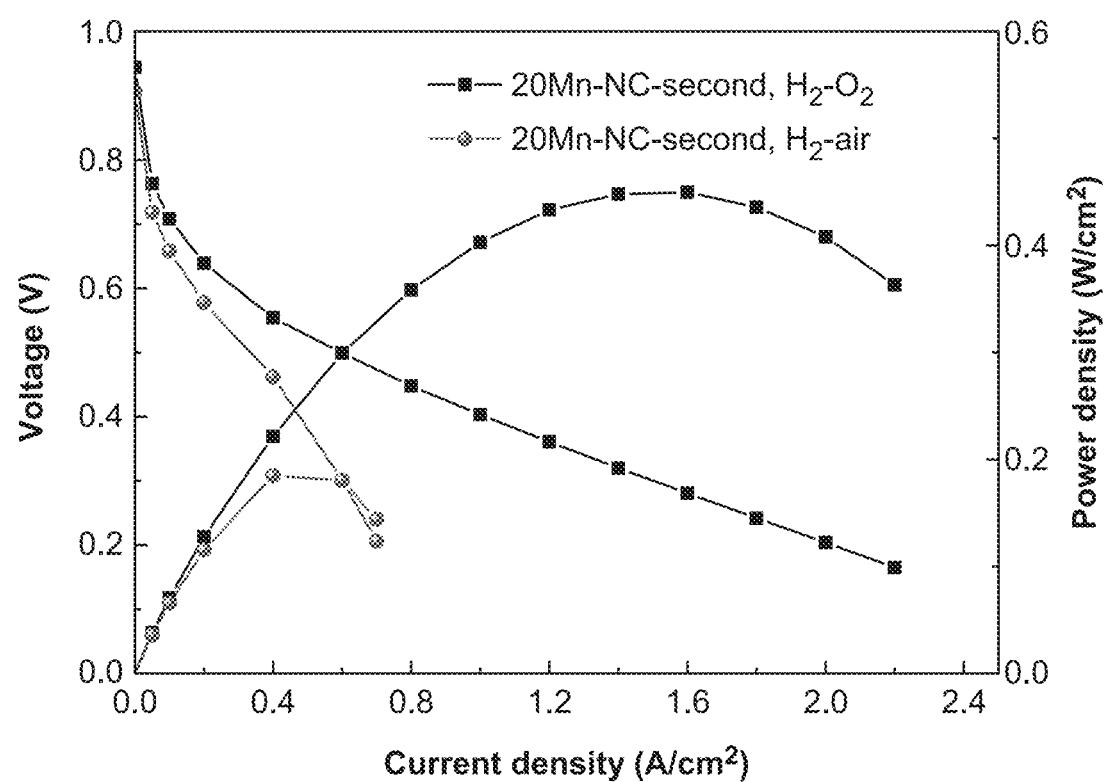
FIG. 30 is a graph depicting fuel cell performance of a comparative 20Mn—NC-second catalyst under $H_2$—$O_2$ and $H_2$-air conditions.

The performance of the catalysts were also investigated under practical $H_2$-air conditions under the following conditions: cathode—4.0 mg $cm^{-2}$; air flow rate—1000 sccm; 100% RH; 1 bar air partial pressure; anode—0.3 $mgp_t$ $cm^{-2}$ Pt/C; $H_2$ flow rate—200 sccm; 100% RH; membrane—Nafion® 212. As can be seen in FIG. 29B, due to the mass transport limitation in the air, the performance gap among the different catalysts became more apparent. The OCV of the Mn—N—C—HCl-800/1100 was 0.91 V, which was comparable to other reported iron-free cathode catalysts. More importantly, the maximum power density was 0.39 W cm$^{-2}$ under 1.0 bar pressure of H$_2$/air, which outperformed all Fe-free cathode catalysts and was comparable with iron-based catalysts. The achieved power density was two times higher than that of our previously reported 20Mn—NC-second catalysts (see FIG. 30). The significantly enhanced performance at a high current density region is due to dramatically enhanced mass transport. The curved surface structure likely favors the formation of abundant mesopores/macropores, which can enhance the mass transport and improves the utilization of active sites by facilitating ionomer dispersion and distribution. This was verified by microscopy images of MEA structures, where the Mn—N—C—HCl-800/1100 catalyst layer exhibited a porous structure and uniform ionomer distribution. In contrast, large aggregates, dense structure, and high concentrated ionomer were observed for the previous 20Mn—NC-second catalyst layer.

The ratio of ionomer to catalyst was also modulated by preparing MEAs using the best performing Mn—N—C—HCl-800/1100 catalyst (see FIG. 29C). The optimal I/C ratio is determined to be 0.8. The electrochemical surface area (ECSA) of catalysts can be measured to evaluate the number of active sites in contact with ionomer by impacting the ionomer dispersion and infiltration. In this case, when the ratio of I/C was increased from 0.6 to 0.8, both better ionomer coverage of the catalyst and more ionomer infiltration into the catalyst layer were achieved. Thus, the contact area between the catalysts and ionomer was increased. The MnN$_4$ active sites can participate in the oxygen reduction reaction only when located at the three-phase boundary of the ionomer, oxygen, and carbon. Consequently, the utilization of active sites and the performance of catalysts can be further improved when an optimal I/C ratio is employed. The utilization of catalysts could not be further improved by using excessive ionomer, which only increases the thickness of the ionomer film, leading to high local transport resistance and flooding. In addition, the extra amount of ionomer could block the pores in the electrode. The effect of the primary catalyst size on MEA performance was also studied (see FIG. 29D). The catalyst with a particle size of 85 nm demonstrated the best performance due to the uniform distribution of particles, improving the ionomer dispersion and catalyst utilization. Catalysts having a particle size of 30 nm and 200 nm showed inferior MEA performance to the catalyst having a particle size of 85 nm. Large aggregates were observed for the 30 nm catalyst, which prohibited the ionomer from infiltrating into the bulk particles. The majority of the ionomer was usually located around the aggregates, and the interior of the catalyst aggregates lacked ionomer. Even though the 200 nm particles were well distributed, its lower oxygen reduction reaction activity and lower surface area affected MEA performance. Moreover, the ionomer film thickness would be significantly increased if the primary particle size was increased up to 200 nm, which reduced the mass transport dramatically. Maximum power density and current density at 0.7 V for various iron-free catalysts are summarized in FIG. 29E. As can be seen, the Mn—N—C catalyst of the present invention shows the most promising performance to replace iron-based catalysts under realistic H$_2$-air conditions for fuel cell applications.

Figure 29F:
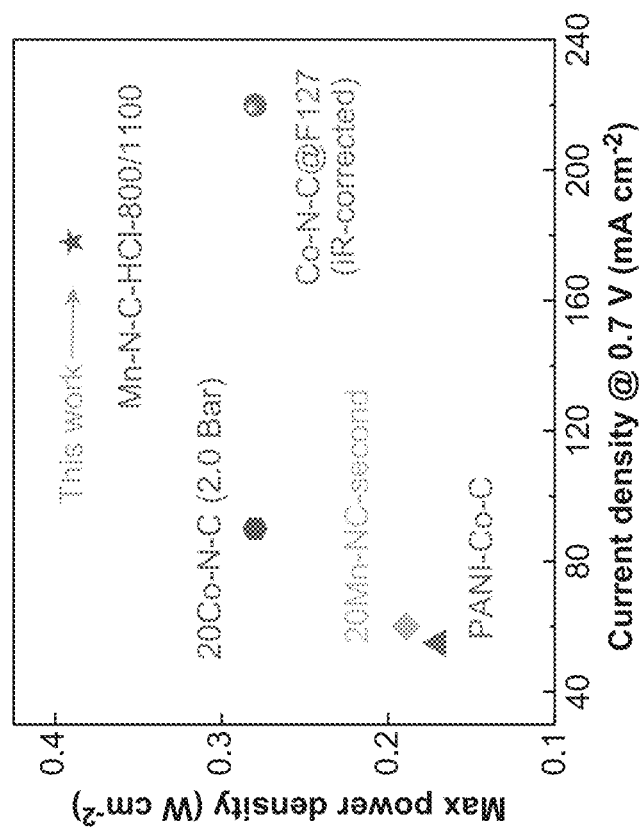
FIG. 29F is a graph depicting fuel cell durability tests of Mn—N—C and Fe—N—C catalysts prepared according to the present invention at a constant potential of 0.65 V under $H_2$-air conditions.
Figure 31:
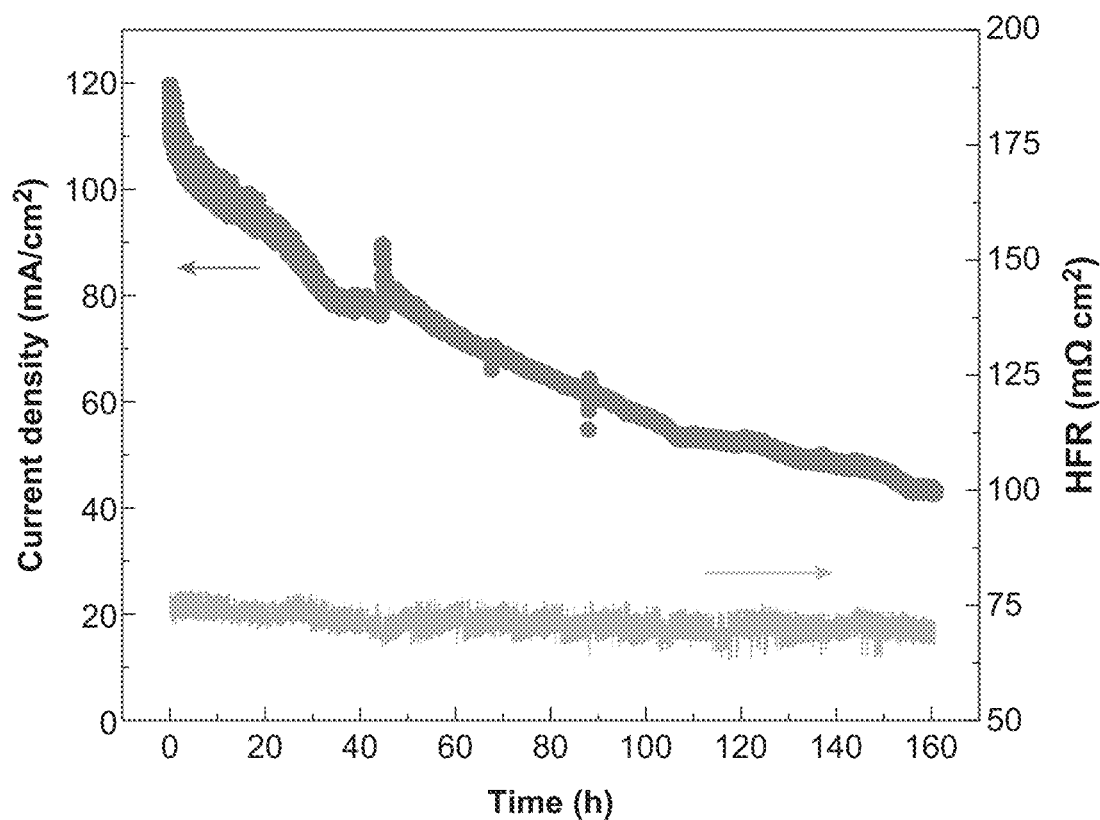
FIG. 31 is a graph depicting fuel cell durability tests of an Mn—N—C catalyst prepared according to the present invention at a constant potential of 0.65 V.

The MEA durability test of the Mn—N—C—HCl-800/1100 catalyst was also carried out. The cell was tested at a constant voltage of 0.65 V for 160 hours. The performance loss is shown in FIG. 31, in which 80% activity was retained after the first 16 hours, outperforming most existing Fe-free cathode catalysts. After 100 hours, more than 50% activity was maintained, demonstrating moderate performance degradation under harsh conditions. The degradation rate was calculated per every 20 hours. The significant performance loss occurred in the first 20 hours with a decay rate of 1.26 mA cm$^{-2}$h$^{-1}$. After around 40 hours, the degradation rate became minimal. For comparison, a Fe—N—C catalyst with well-defined FeN$_4$ sites was tested under the same condition (FIG. 29F). The Fe—N—C catalyst exhibited a much faster degradation rate, which is more than twice that of the Mn catalysts. The fast degradation at the initial phase can be mainly attributed to the metal leaching caused by bond breaking between the metal center and adjacent nitrogen atoms. The much faster degradation of the Fe—N—C catalyst was associated with the fragile nature of the Fe—N bond as elucidated using DFT studies. The new Mn—N—C catalyst could be more durable than Fe—N—C catalysts due to the robust nature of MnN$_4$ sites as well as enhanced resistance of carbon corrosion. By comparing the carbon structure of those Mn— and Fe—N—C catalysts, a more predominantly graphitic carbon structure was observed for the Mn—N—C catalyst.

The durability issue is the grand challenge for M—N—C catalysts compared with PGM catalysts, especially at high voltages (>0.6 V). The possible causes of M—N—C catalyst degradation were studied in fuel cell cathodes, including the dissolution of MN$_4$ active sites, carbon oxidation, and the collapse of the three-phase boundary. Based on these mechanisms, the correlated efforts should be focused on the enhancement of the M-N bond by modifying the coordination environment and improvement of carbon materials by increasing the graphitic structure at both atomic and macroscopic levels. Moreover, the MEA fabrication techniques can mitigate the performance loss by effectively creating robust three-phase interfaces.

In summary, a new atomically dispersed Mn—N—C oxygen reduction catalyst is disclosed herein that uses an aqueous solution synthesis method and preferably employs a two-step doping-adsorption approach. Distinguished from prior approaches, the effective acid-assisted aqueous solution method combined with a multistep-pyrolysis (800° C. and 1100° C.), in accordance with the present invention, enables curved surface and porous structures of the Mn—N—C catalyst. In addition to low-cost and environmental feasibility, aqueous synthesis in accordance with the present invention leads to an extremely high surface area of the Mn catalysts (1511 m$^2$g$^{-1}$), which is favorable for hosting atomically dispersed single metal sites.

The atomically dispersed nitrogen-coordinated Mn sites have been directly visualized and verified by using HAADF-STEM coupled with EELS at the atomic level. XAS results indicate that the Mn ions have a 2+ valence and are coordinated by four N atoms. Remarkable activity and stability of the Mn—N—C catalyst have been confirmed by using RDE in acidic media. The enhanced stability is due to the robust nature of the MnN$_4$ structure and the high corrosion resistance of its graphitic carbon structure. Additionally, this enhanced stability of MnN$_4$ is also elucidated by using DFT calculations, in which MnN$_4$ shows higher resistance to metal leaching than FeN$_4$. The Mn—N—C cathode catalysts also demonstrate promising fuel cell performance in MEAS. The maximum power density for this catalyst is 0.39 W cm$^{-2}$ under practical H$_2$-air conditions representing the most promising Fe— and PGM-free cathode catalysts.

The improved MEA stability of the Mn—N—C catalyst has also been observed via a constant voltage test under realistic $H_2$-air conditions.

One of the unique features of the Mn—N—C catalyst is its curved surface morphology, which can provide increased external surface and abundant mesopores/macropores. Moreover, the graphitic structure in the catalyst significantly enhances carbon corrosion resistance during the oxygen reduction reaction, thus leading to improved stability when compared to other M—N—C catalysts. The atomic $MnN_4$ site catalyst can be prepared from an environmentally benign aqueous solution with remarkable activity and stability. The atomically dispersed Mn—N—C catalyst, free of Fe and PGMs, holds great promise for future PEM fuel cells and other advanced electrocatalysis, such as $CO_2$ reduction and nitrogen reduction.

The synthesis of ZIF-8 in aqueous solutions, in accordance with the present invention, has many advantages including high efficiency, low cost, and being environmentally friendly.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method of preparing a catalyst, the method comprising the steps of:
    (a) preparing an M-doped ZIF-8 catalyst precursor in an aqueous synthesis reaction, wherein M is selected from the group consisting of Mn, Fe, Ni, Cu, and Co, wherein ZIF-8 is a 2-methylimidazole zinc salt, and wherein the aqueous synthesis reaction takes place in the presence of an acid and in the absence of an organic solvent; and
    (b) then, carbonizing the M-doped ZIF-8 catalyst precursor in a first thermal activating step to form an M—N—C catalyst, wherein M is said metal, N is nitrogen, and C is carbon.

2. A method of preparing a catalyst, the method comprising the steps of:
    (a) preparing an M-doped ZIF-8 catalyst precursor in an aqueous synthesis reaction, wherein M is selected from the group consisting of Mn, Fe, Ni, Cu, and Co, wherein ZIF-8 is a 2-methylimidazole zinc salt, and wherein the M-doped ZIF-8 catalyst precursor is prepared by reacting a first solution comprising zinc nitrate hexahydrate and manganese chloride dissolved in a solution of hydrochloric acid dissolved in water with a second solution comprising 2-methylimidazole dissolved in water; and
    (b) then, carbonizing the M-doped ZIF-8 catalyst precursor in a first thermal activating step to form an M—N—C catalyst, wherein M is said metal, N is nitrogen, and C is carbon.

3. The method as claimed in claim 2 wherein the molar ratio of $Mn^{2+}$ to $Zn^{2+}$ used for the aqueous synthesis reaction ranges from greater than 0 up to about 10%.

4. The method as claimed in claim 2 wherein the molar ratio among $MnCl_2$, $Zn(NO_3)_2 \cdot 6H_2O$, and 2-methylimidazole is about 0.015:1:47, respectively.

5. The method as claimed in claim 1 wherein M is Mn.

6. The method as claimed in claim 1 wherein the first thermal activating step comprises heating the Mn-doped ZIF-8 catalyst precursor at an elevated temperature of at least 600° C.

7. A method of preparing a catalyst, the method comprising the steps of:
    (a) preparing an M-doped ZIF-8 catalyst precursor in an aqueous synthesis reaction, wherein M is selected from the group consisting of Mn, Fe, Ni, Cu, and Co, and wherein ZIF-8 is a 2-methylimidazole zinc salt; and
    (b) then, carbonizing the M-doped ZIF-8 catalyst precursor in a first thermal activating step to form an M—N—C catalyst, wherein M is said metal, N is nitrogen, and C is carbon, wherein the first thermal activating step comprises heating the Mn-doped ZIF-8 catalyst precursor in a first step at a first temperature of about 600° C.-1000° C. and then in a second step at a second temperature of about 900° C.-1100° C., and wherein the second temperature is higher than the first temperature.

8. The method as claimed in claim 7 wherein the first thermal activating step comprises heating the Mn-doped ZIF-8 catalyst precursor in a first step at a first temperature of about 800° C. and then in a second step at a second temperature of about 1100° C.

9. The method as claimed in claim 6 wherein the first thermal activating step comprises heating the Mn-doped ZIF-8 catalyst precursor at a temperature of about 1100° C.

10. A method of preparing a catalyst, the method comprising the steps of:
    (a) preparing an M-doped ZIF-8 catalyst precursor in an aqueous synthesis reaction, wherein M is selected from the group consisting of Mn, Fe, Ni, Cu, and Co, and wherein ZIF-8 is a 2-methylimidazole zinc salt;
    (b) then, carbonizing the M-doped ZIF-8 catalyst precursor in a first thermal activating step to form an M—N—C catalyst, wherein M is said metal, N is nitrogen, and C is carbon, and wherein the M—N—C catalyst is an Mn—N—C catalyst;
    (c) adsorbing additional Mn ions into the Mn—N—C catalyst; and
    (d) then, performing a second thermal activating step on the catalyst of step (c).

11. The method as claimed in claim 10 wherein the aqueous synthesis reaction of step (a) takes place in the presence of an acid, wherein the first thermal activating step comprises a first temperature of about 800° C. and a second temperature of about 1100° C., and wherein the second thermal activating step comprises heating at about 1100° C.

12. The method as claimed in claim 1 wherein the M—N—C catalyst has a particle size of about 30 nm to about 200 nm.

13. A method of preparing a catalyst, the method comprising the steps of:
    (a) preparing an M-doped ZIF-8 catalyst precursor in an aqueous synthesis reaction, wherein M is selected from the group consisting of Mn, Fe, Ni, Cu, and Co, and wherein ZIF-8 is a 2-methylimidazole zinc salt; and
    (b) then, carbonizing the M-doped ZIF-8 catalyst precursor in a first thermal activating step to form an M—N—C catalyst, wherein M is said metal, N is nitrogen, and C is carbon, and wherein the M—N—C catalyst has a particle size of about 85 nm.

14. A catalyst prepared by the method of claim 1.

15. A catalyst prepared by the method of claim 2.

16. A catalyst prepared by the method of claim 3.

17. A catalyst prepared by the method of claim 4.

18. A catalyst prepared by the method of claim 5.
19. A catalyst prepared by the method of claim 6.
20. A catalyst prepared by the method of claim 7.
21. A catalyst prepared by the method of claim 8.
22. A catalyst prepared by the method of claim 9.
23. A catalyst prepared by the method of claim 10.
24. A catalyst prepared by the method of claim 11.
25. A catalyst prepared by the method of claim 12.
26. A catalyst prepared by the method of claim 13.
27. A membrane electrode assembly suitable for use in a proton-exchange membrane fuel cell, the membrane electrode assembly comprising:
  (a) a proton-exchange membrane, the proton-exchange membrane having opposing first and second faces;
  (b) an anode coupled to the first face of the proton-exchange membrane, the anode comprising an anode catalyst; and
  (c) a cathode coupled to the second face of the proton-exchange membrane, the cathode comprising a cathode catalyst, the cathode catalyst comprising the catalyst of claim 14.
28. A membrane electrode assembly suitable for use in a proton-exchange membrane fuel cell, the membrane electrode assembly comprising:
  (a) a proton-exchange membrane, the proton-exchange membrane having opposing first and second faces;
  (b) an anode coupled to the first face of the proton-exchange membrane, the anode comprising an anode catalyst; and
  (c) a cathode coupled to the second face of the proton-exchange membrane, the cathode comprising a cathode catalyst, the cathode catalyst comprising the catalyst of claim 24.
29. The method as claimed in claim 1 wherein the M-doped ZIF-8 catalyst precursor is prepared by reacting a first solution comprising zinc nitrate hexahydrate and manganese chloride dissolved in water with a second solution comprising 2-methylimidazole dissolved in water.
30. The method as claimed in claim 1 wherein the aqueous synthesis reaction of step (a) takes place in a solvent of water.
31. The method as claimed in claim 1 wherein the aqueous synthesis reaction of step (a) takes place at room temperature.

* * * * *